Dec. 7, 1926. 1,609,691
R. W. CANFIELD
GLASS WORKING APPARATUS
Filed July 15, 1922 22 Sheets-Sheet 2

INVENTOR
Robert W. Canfield
BY
ATTORNEY

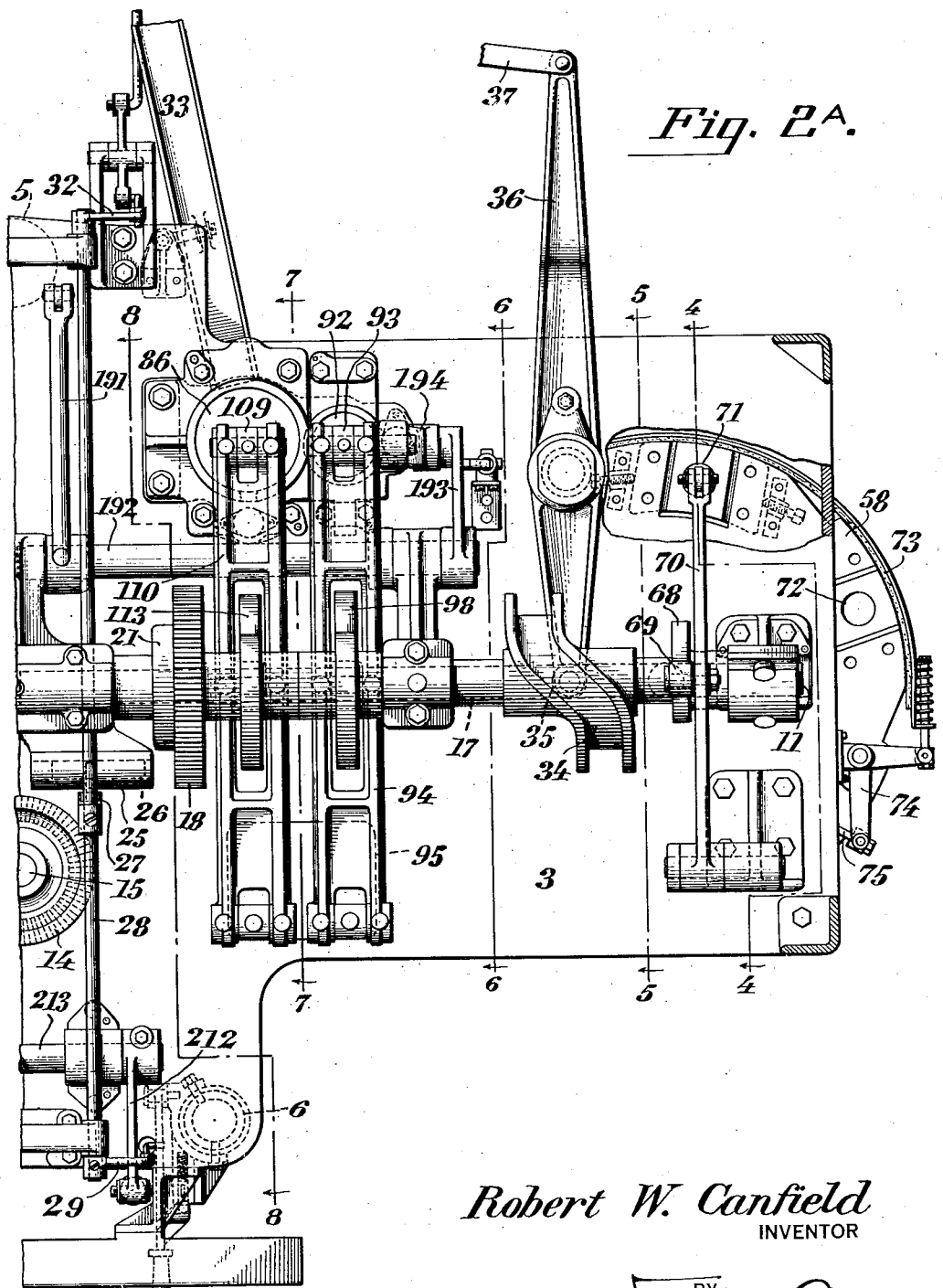

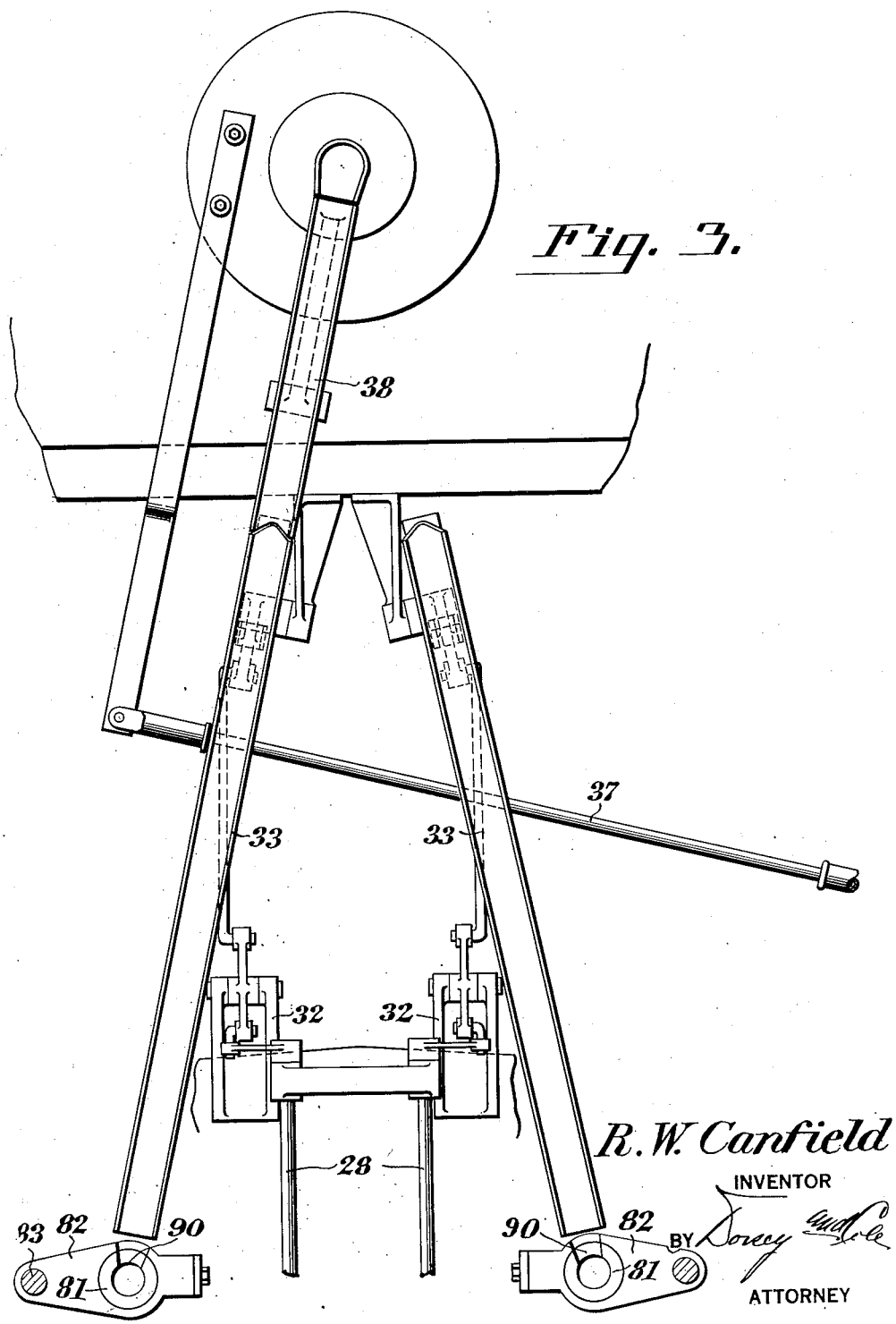

Dec. 7, 1926.

R. W. CANFIELD 1,609,691

GLASS WORKING APPARATUS

Filed July 15, 1922     22 Sheets-Sheet 5

Robert W. Canfield
INVENTOR

BY
ATTORNEY

Dec. 7, 1926.
R. W. CANFIELD
GLASS WORKING APPARATUS
Filed July 15, 1922    22 Sheets-Sheet 6

1,609,691

INVENTOR
Robert W. Canfield
BY
ATTORNE

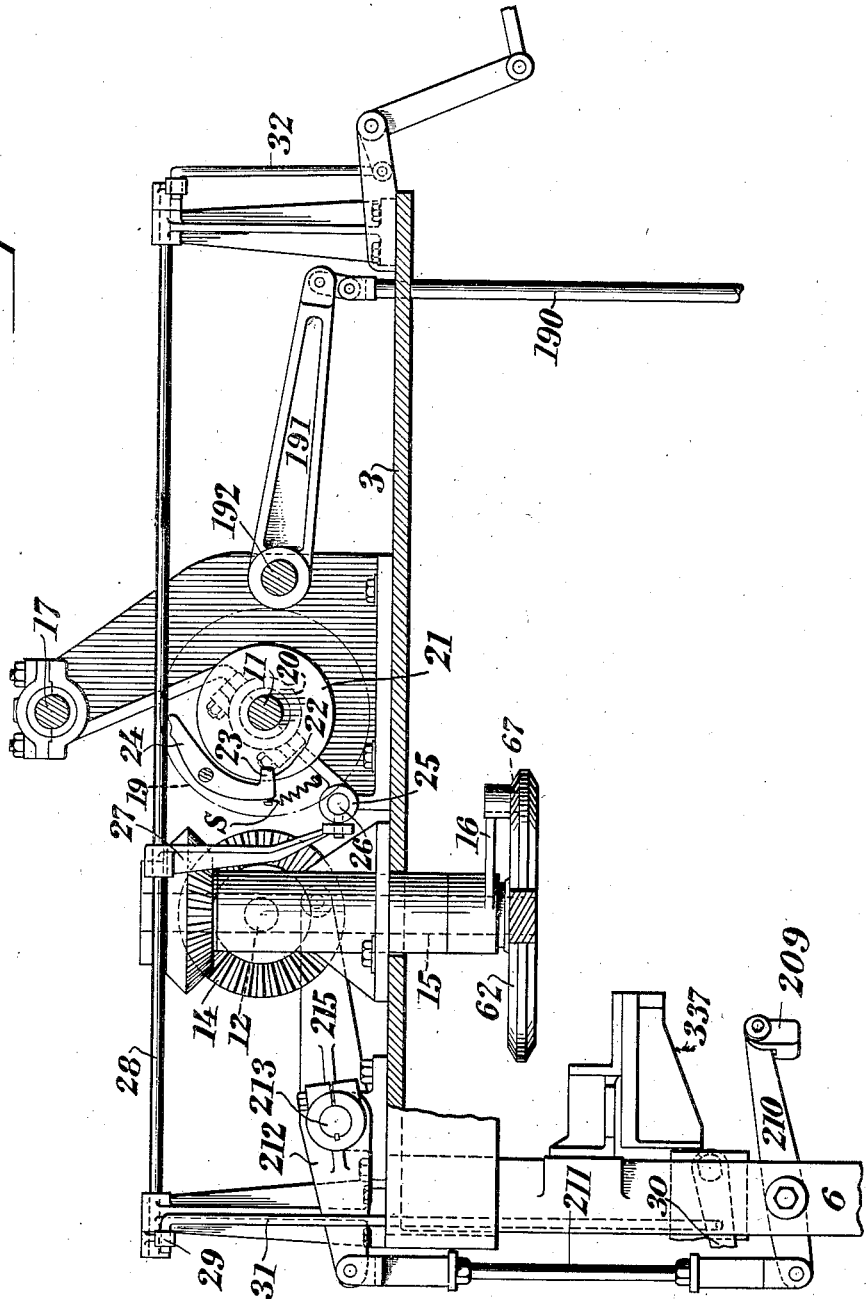

Dec. 7 1926. 1,609,691
R. W. CANFIELD
GLASS WORKING APPARATUS
Filed July 15, 1922 22 Sheets-Sheet 8
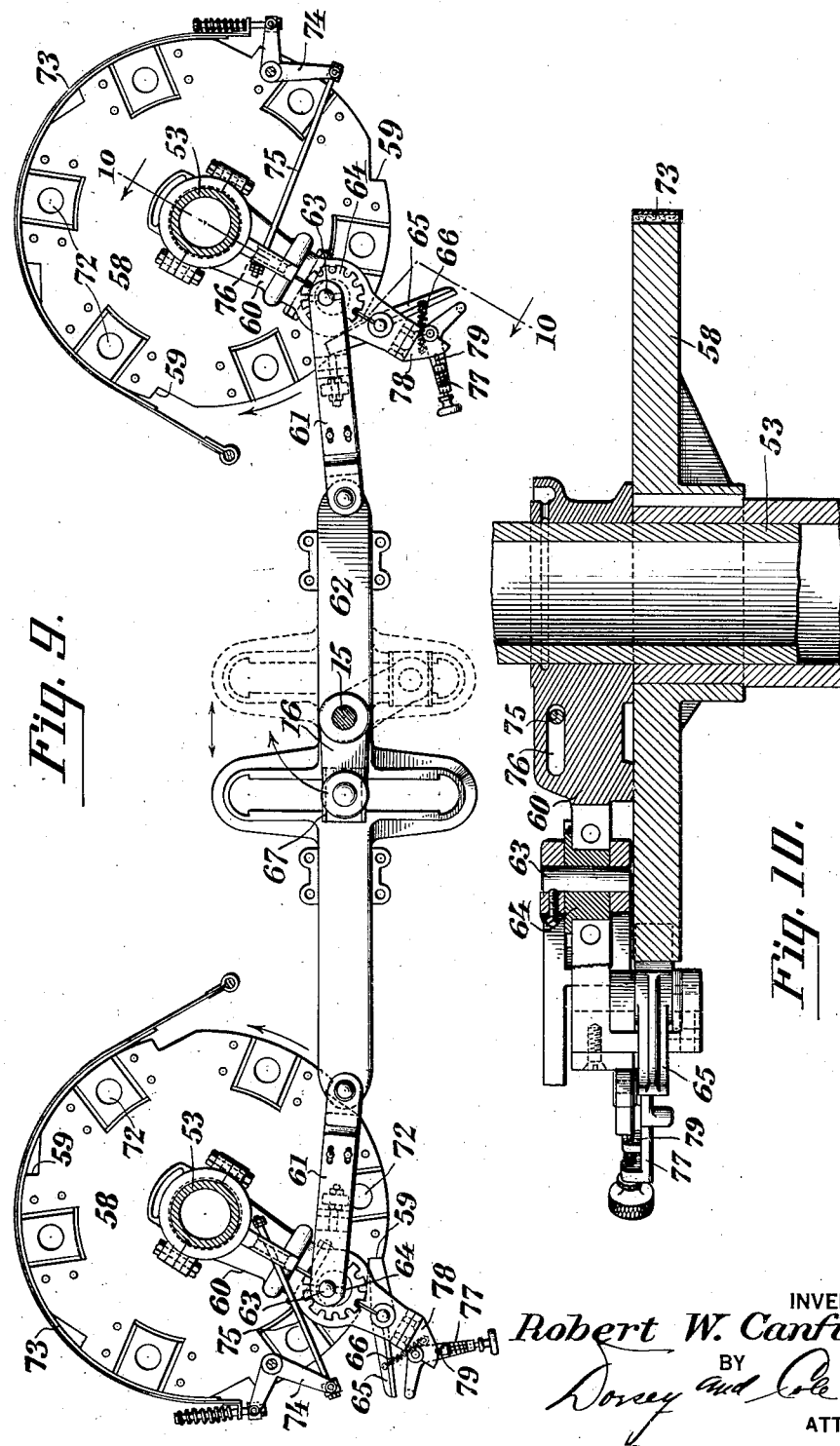
INVENTOR
Robert W. Canfield
BY
Dorsey and Cole
ATTORNEY

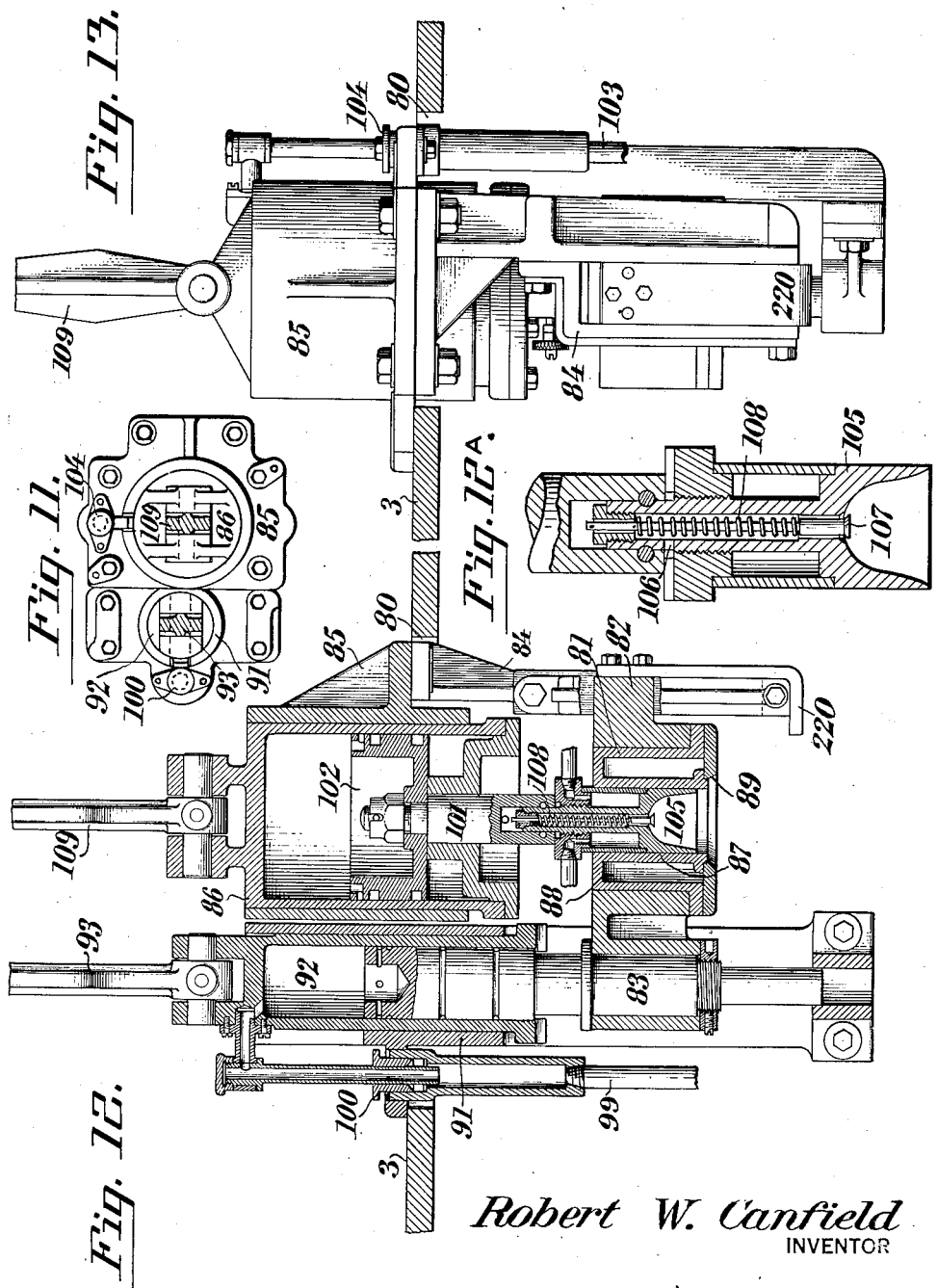

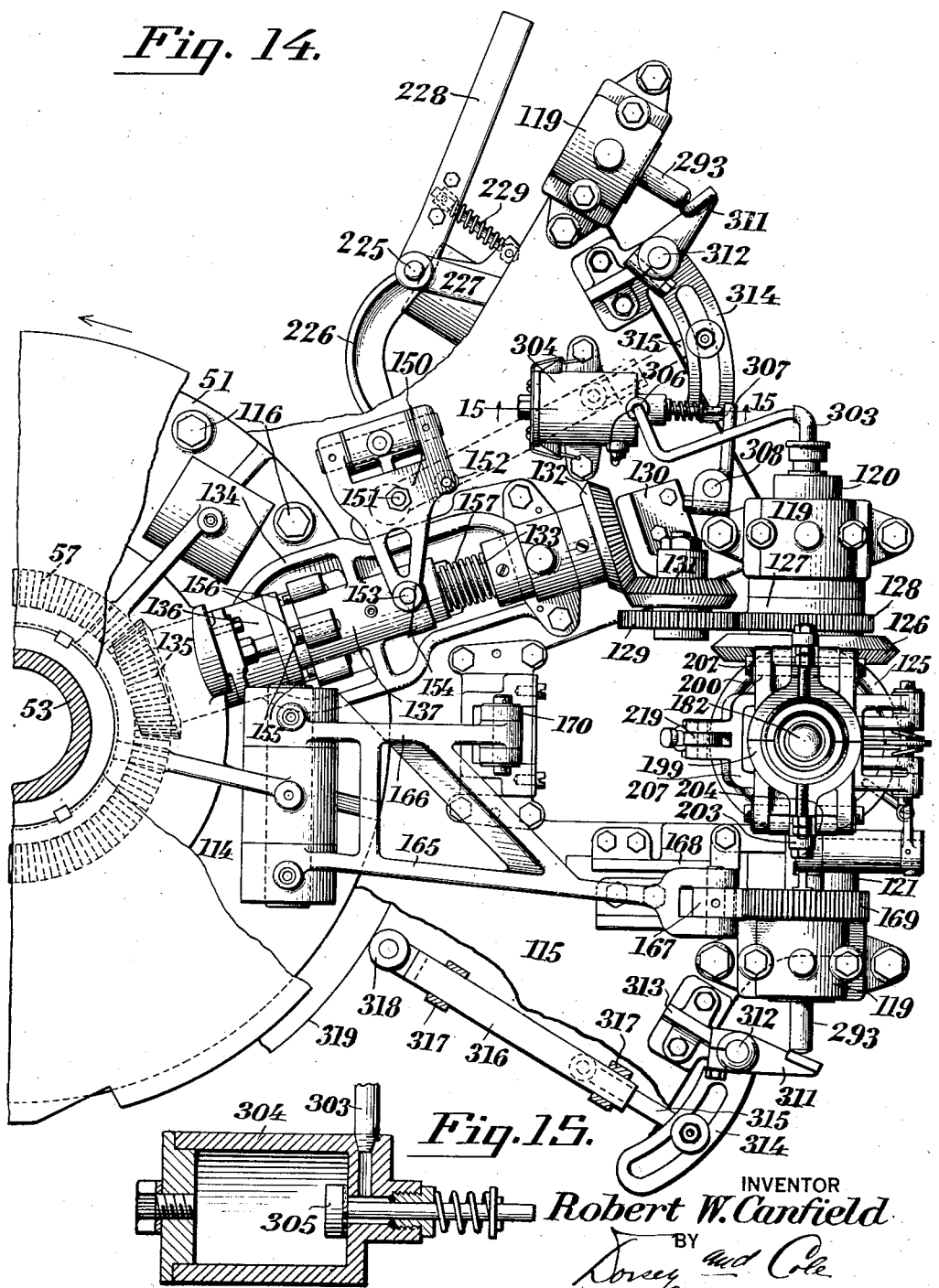

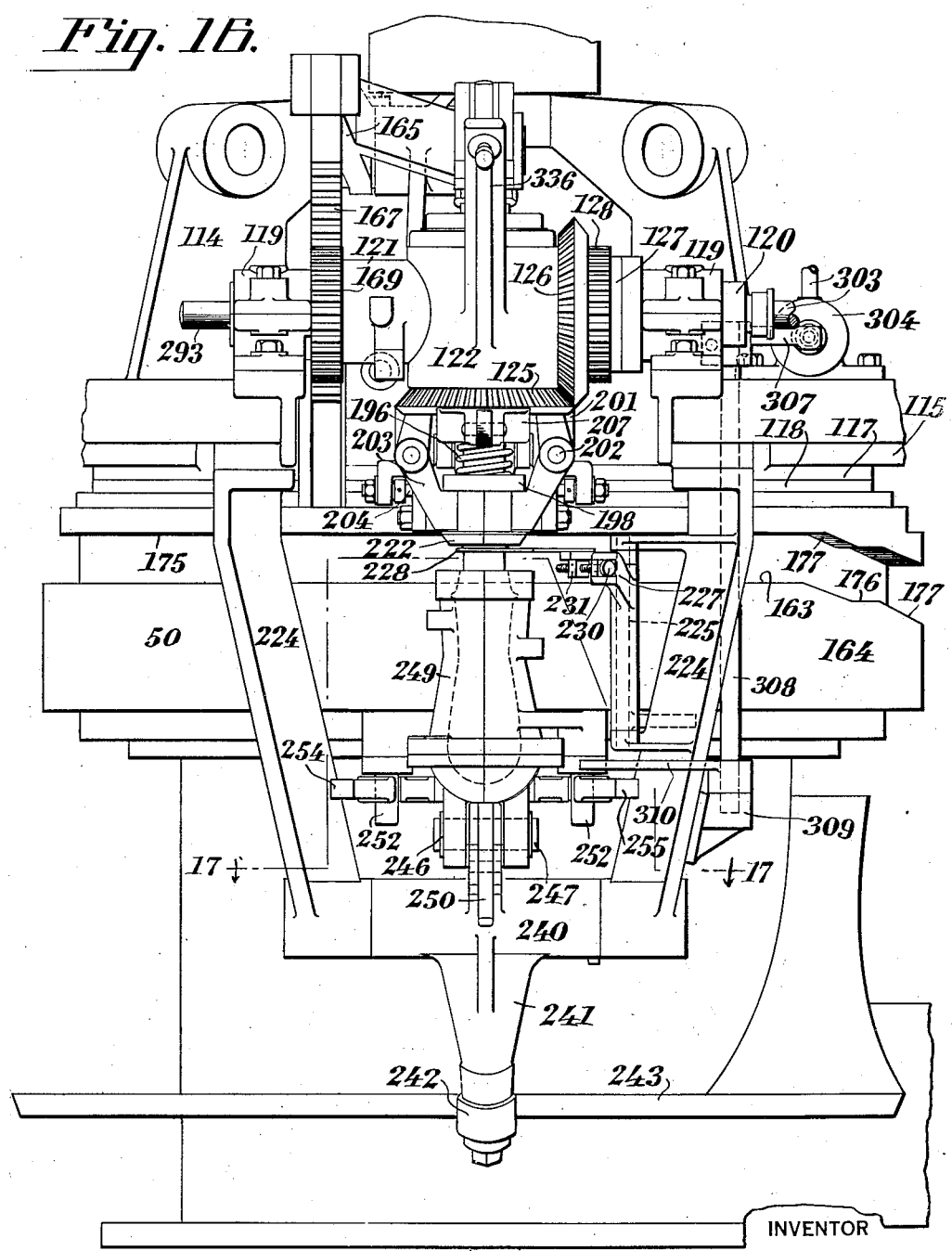

Dec. 7, 1926.
1,609,691
R. W. CANFIELD
GLASS WORKING APPARATUS
Filed July 15, 1922
22 Sheets-Sheet 12

Robert W. Canfield
INVENTOR

BY
ATTORNEY

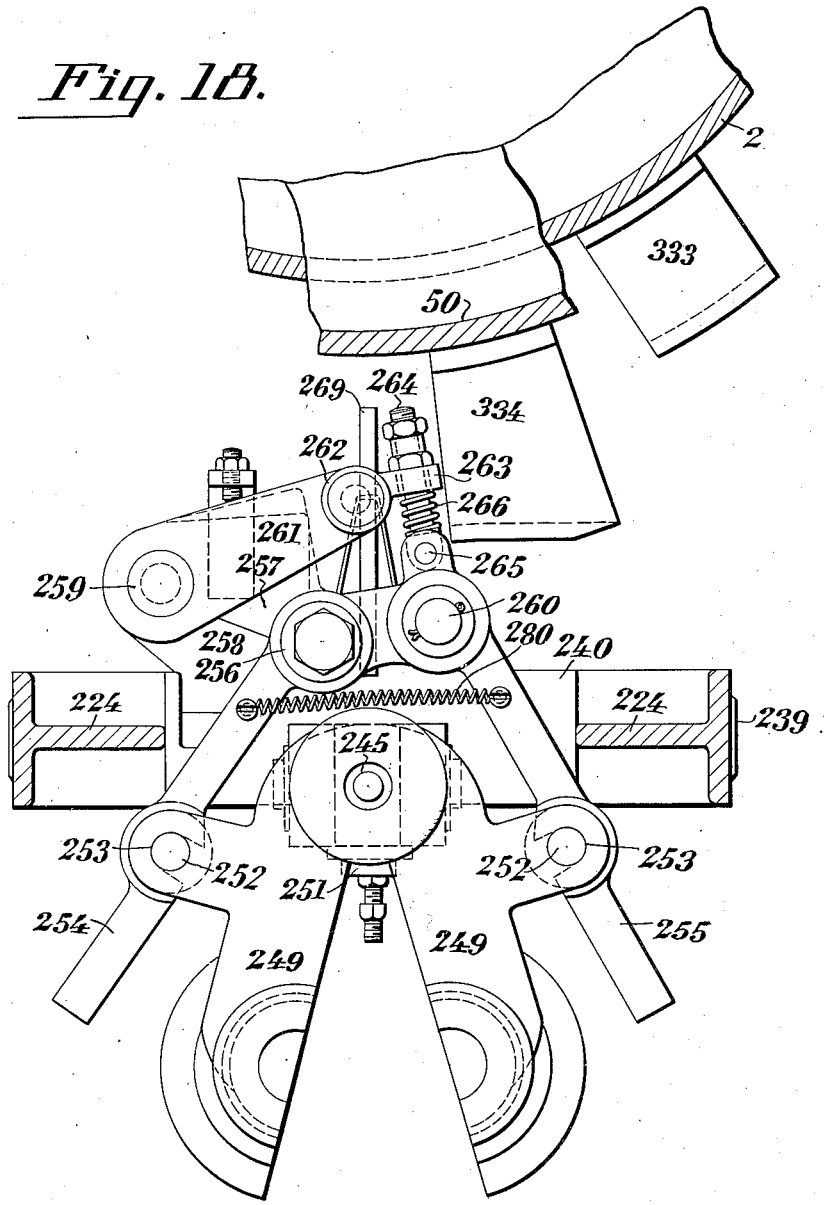

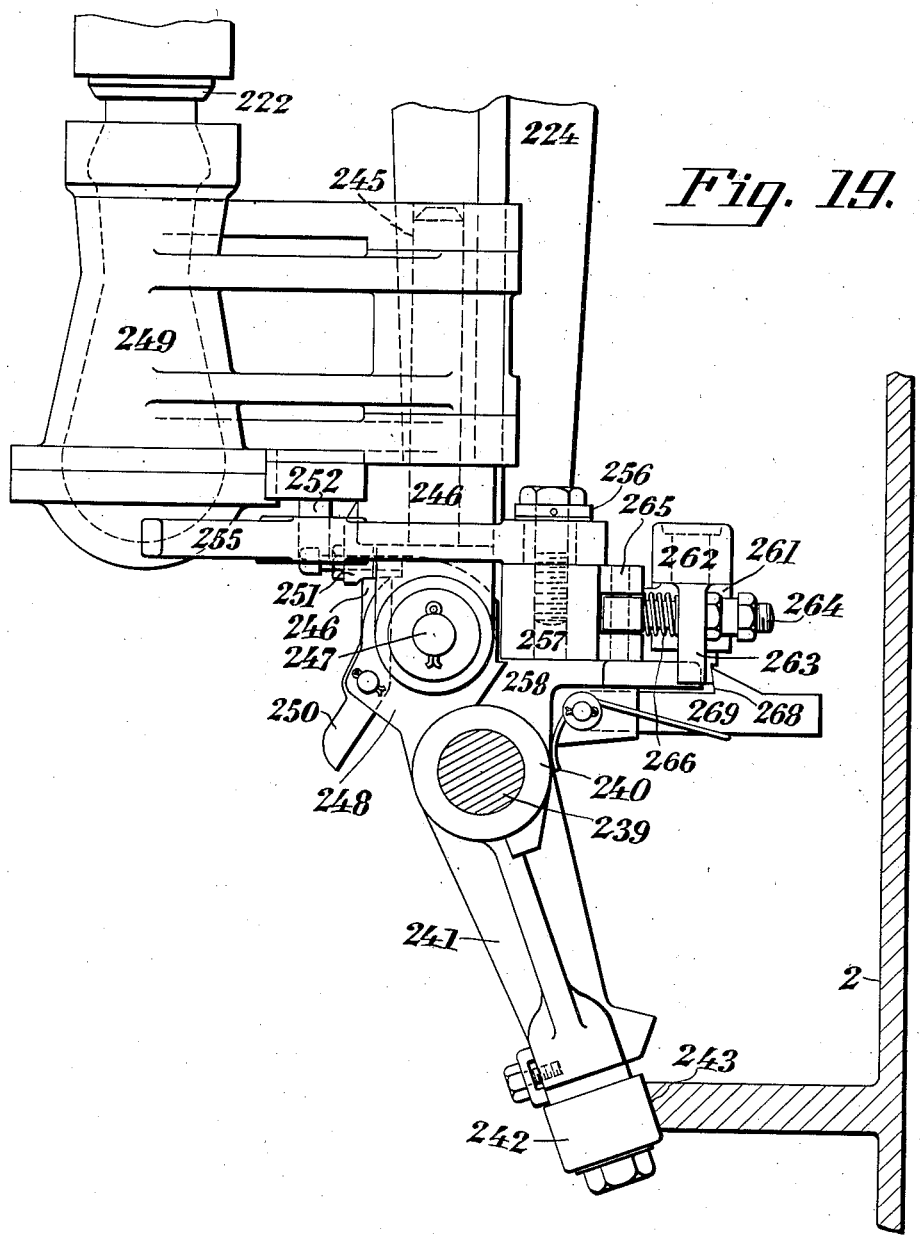

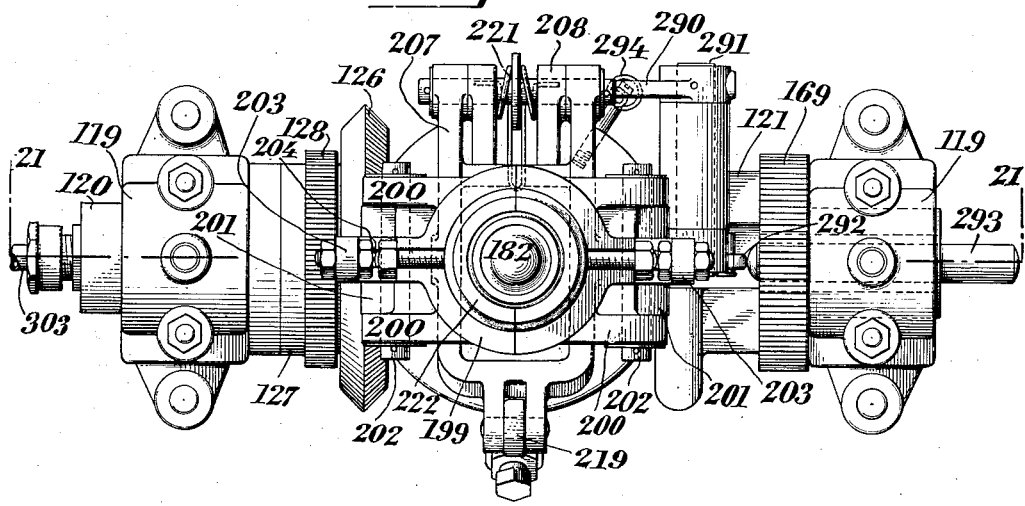
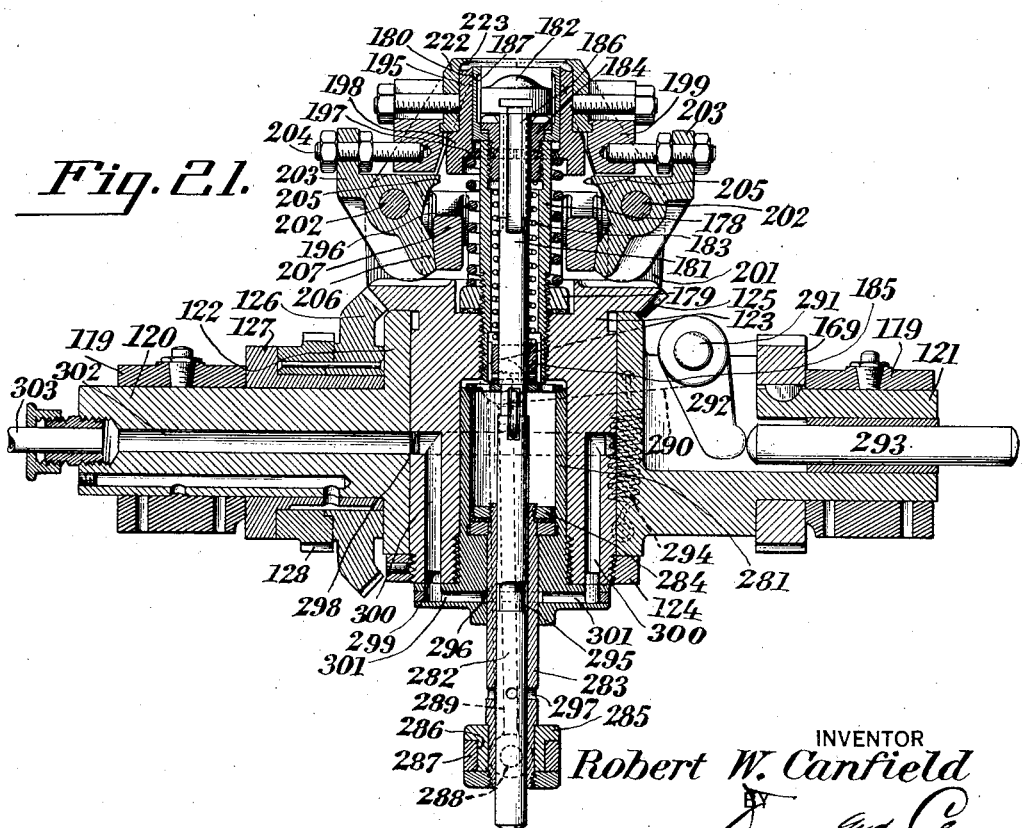

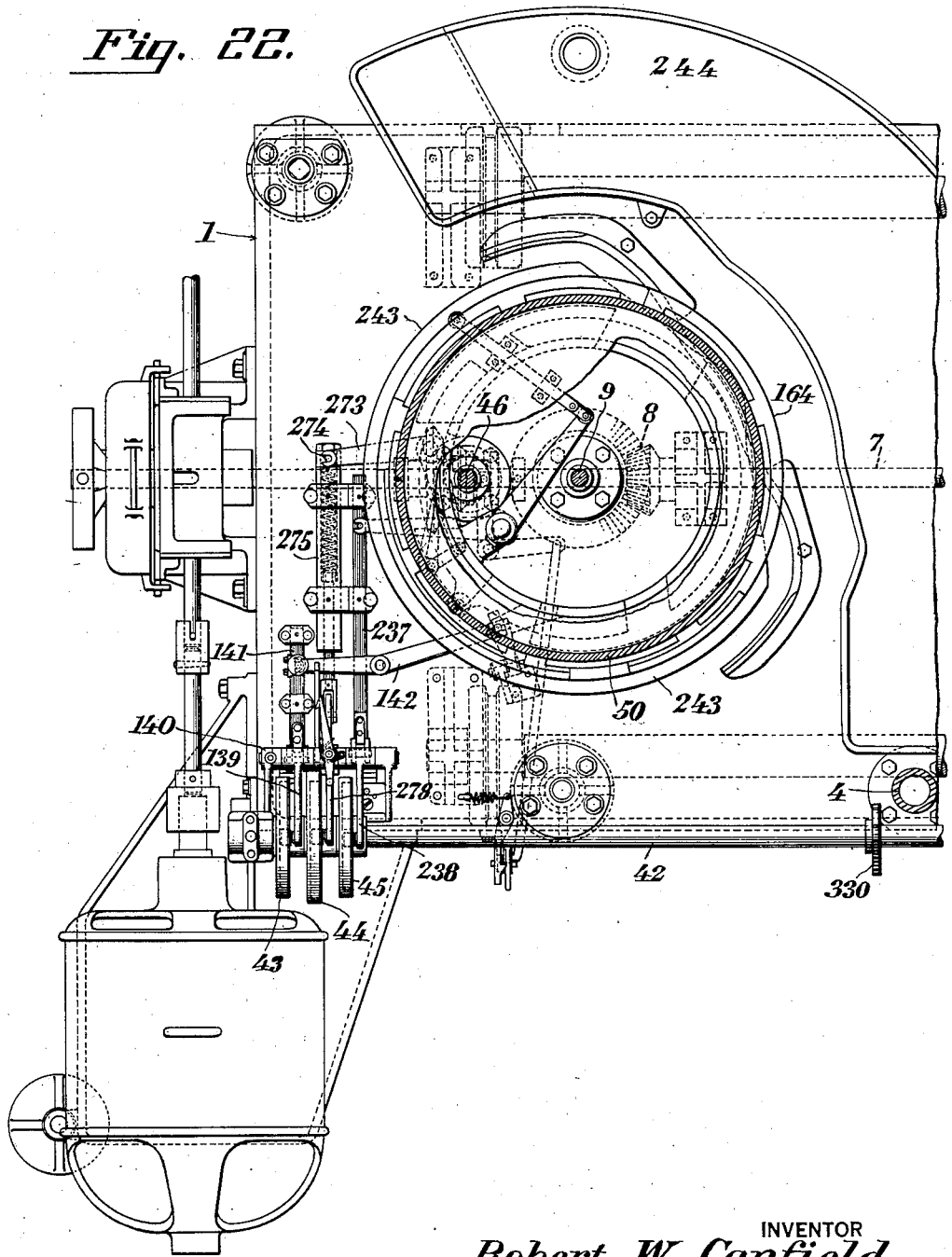

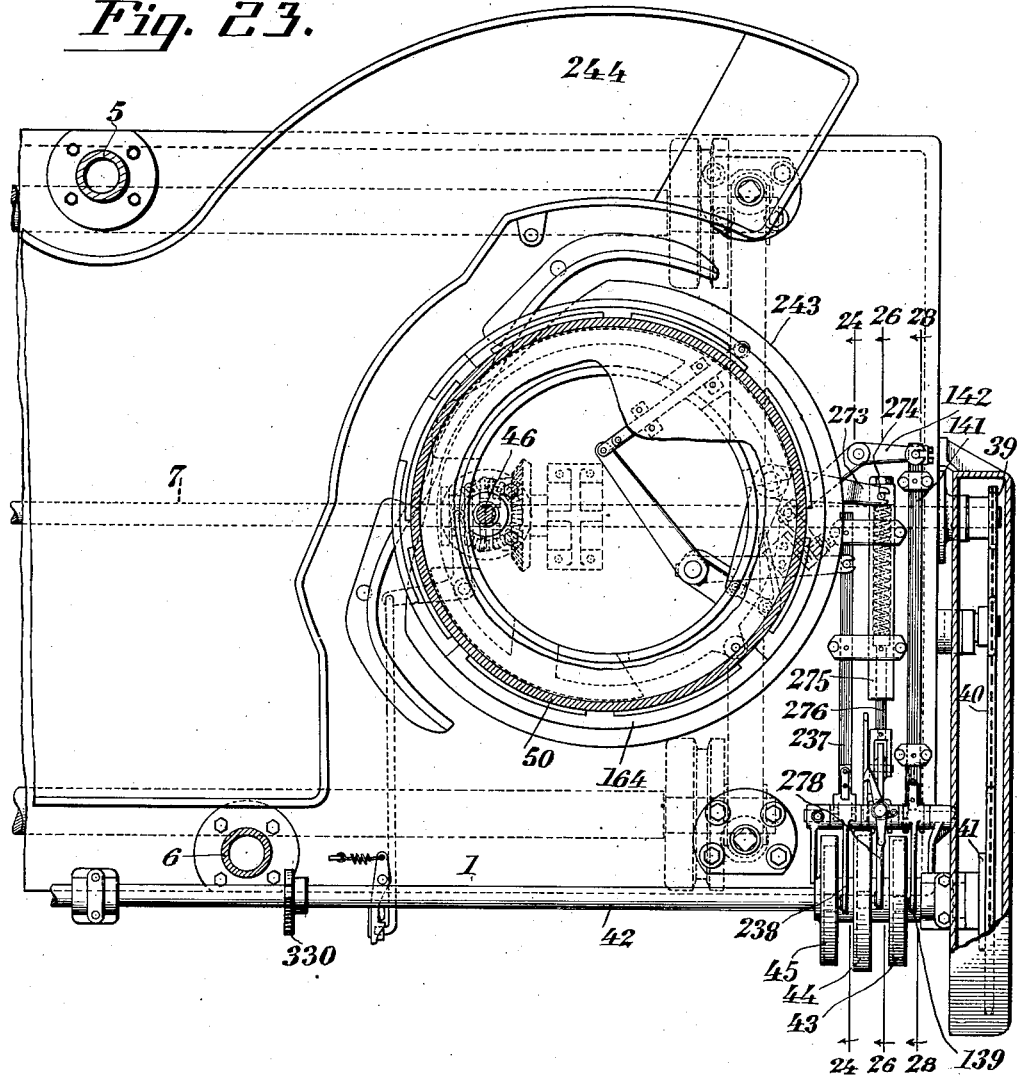

Dec. 7, 1926.  1,609,691
R. W. CANFIELD
GLASS WORKING APPARATUS
Filed July 15, 1922     22 Sheets-Sheet 18
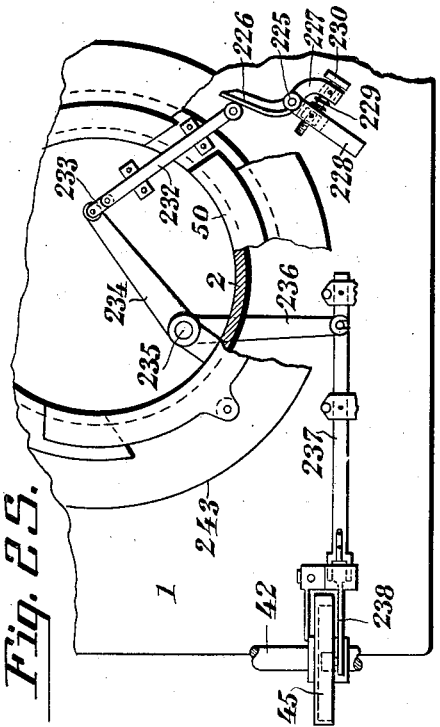
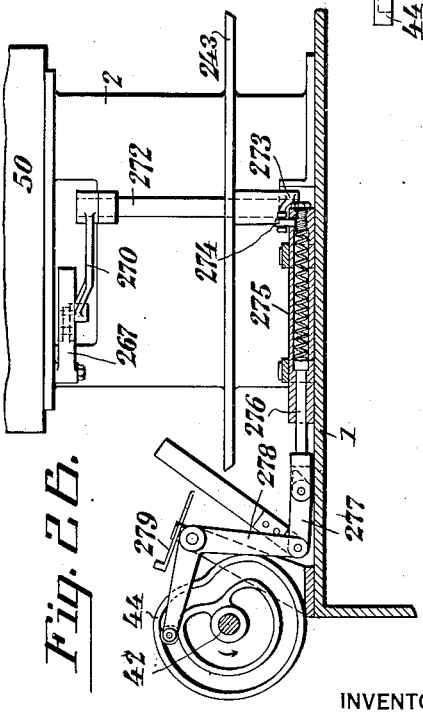
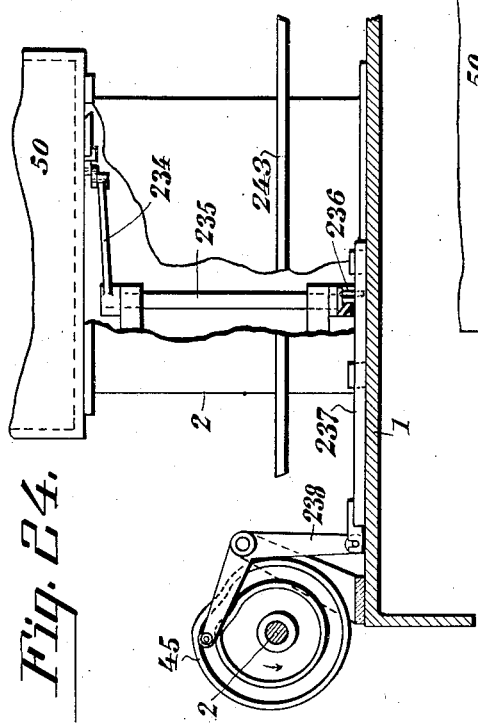
INVENTOR
Robert W. Canfield
BY
Dorsey
ATTORNEY Dec. 7, 1926.

R. W. CANFIELD

GLASS WORKING APPARATUS

Filed July 15, 1922   22 Sheets-Sheet 19

1,609,691

INVENTOR
Robert W. Canfield
BY
ATTORNEY

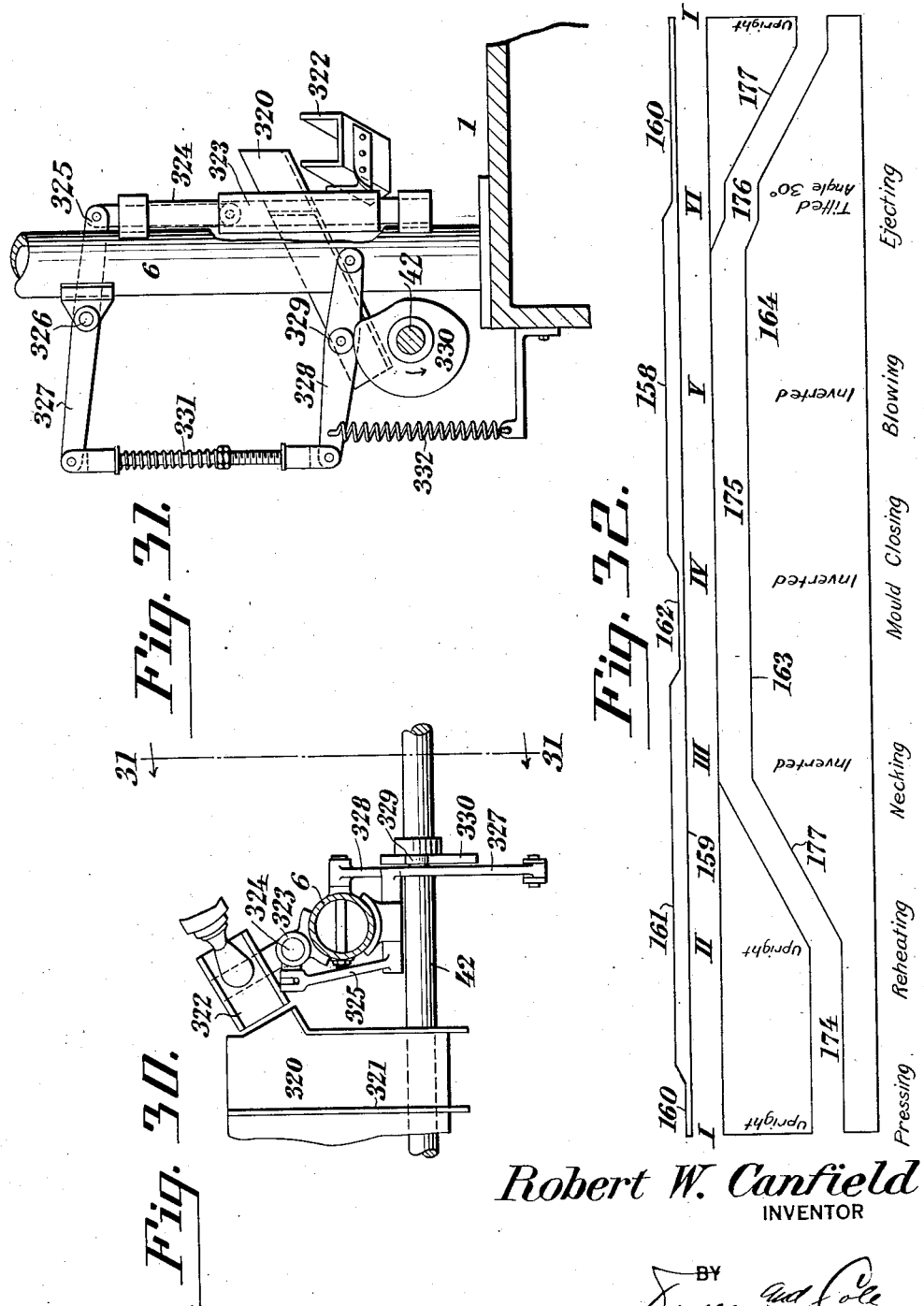

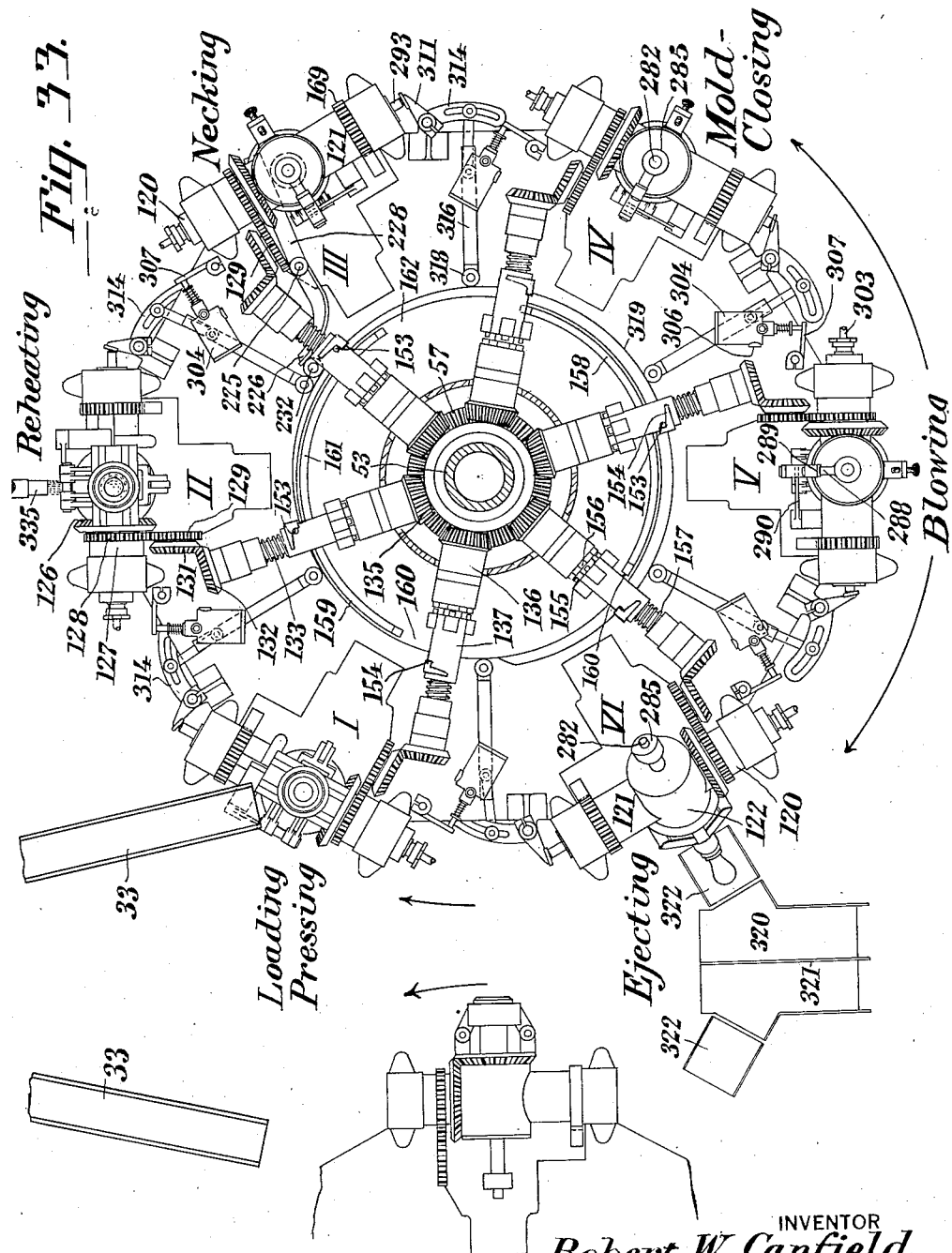

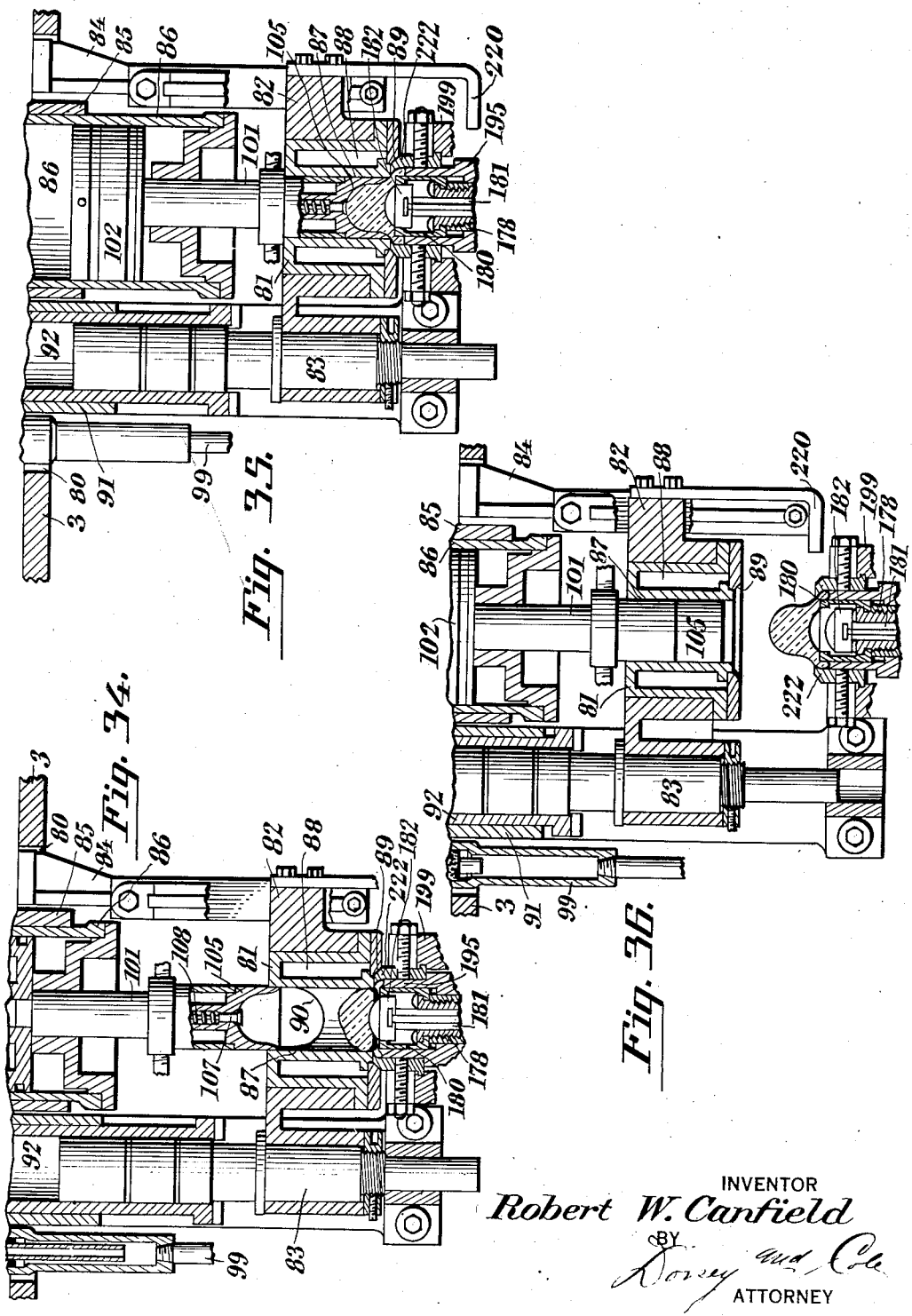

Patented Dec. 7, 1926.

1,609,691

UNITED STATES PATENT OFFICE.

ROBERT W. CANFIELD, OF EAST ORANGE, NEW JERSEY, ASSIGNOR, BY MESNE ASSIGNMENTS, TO HARTFORD-EMPIRE COMPANY, OF HARTFORD, CONNECTICUT, A CORPORATION OF DELAWARE.

GLASS-WORKING APPARATUS.

Application filed July 15, 1922. Serial No. 575,139.

In United States Patent No. 1,260,637 granted March 26, 1918, there is described a glass-working machine and process of working glass wherein means are provided for the production of the finer grades of thin hollow glassware by the press and blow process. In the apparatus shown and described in the patent above referred to, the successive blanks are pressed in a mold on the end of successive glass-working spindles that are mounted with other glass working instrumentalities as units on carriers.

The machine forming the subject matter of this application has for its object to provide construction of a machine of the general type before described. Among the objects had in view are,—to provide a construction especially applicable to be automatically fed with gobs or charges of glass, and to coordinate the forming mechanism with such feeding action in an automatic apparatus for the production of extremely thin hollow vessels, such as electric lamp bulbs, or the finer grades of tumblers and lamp-chimneys. The conditions to be met with in the production of this class of goods are exacting. The glass itself must be properly formed into a blank which is homogeneous and has such a distribution of heat as to permit its proper elongation and expansion.

Another object of the invention is to provide means whereby the blanks from which the articles are formed, are given the approximate shape and proportional thickness of the finished article before such blanks enter the blow-mold for the final shaping.

The several features of construction constituting my invention will be further pointed out in the specification and in the claims which form a part of this application.

The invention is illustrated, in a preferred embodiment, in the accompanying drawings wherein—

Figs. 2 and 2A are enlarged plan views of the instrumentalities of the machine carried by the upper horizontal frame on opposite sides of the medial line thereof;

Fig. 3 is a plan view of the glass delivery troughs showing the relation of such troughs to each of the glass receivers;

Fig. 8 is a vertical section taken on the line 8—8 of Fig. 2A;

Fig. 9 is a horizontal section taken approximately on the line 9—9 of Fig. 1, illustrating the spider-indexing mechanism;

Fig. 10 is a detail section of the spider-indexing mechanism, taken on the line 10—10 of Fig. 9;

Fig. 11 is a detail plan of the glass receiver and press plunger shown in some of the preceding figures;

Fig. 12 is a vertical section of the glass receiver and press plunger shown in some of the preceding figures;

Fig. 12A is a detail vertical section of the press plunger shown in the preceding figure;

Fig. 13 is an elevation of the glass receiver and press plunger;

Fig. 14 is a plan view of one of the sub-units of the machine, showing the glass-carrying spindle and parts associated therewith in loading position;

Fig. 15 is a detail vertical section taken on the line 15—15 of Fig. 14, illustrating the blow-mold air valve;

Fig. 16 is a front elevation of one of the sub-units of the machine, showing the glass-carrying spindle and mold in blowing position;

Fig. 18 is a view similar to Fig. 17, showing the mold open;

Fig. 19 is a side elevation of the mold in closed position;

Fig. 20 is an enlarged plan view of one of the glass-carrying spindles;

Fig. 21 is a vertical section of the glass-carrying spindle taken on the line 21—21 of Fig. 20;

Figure 1:
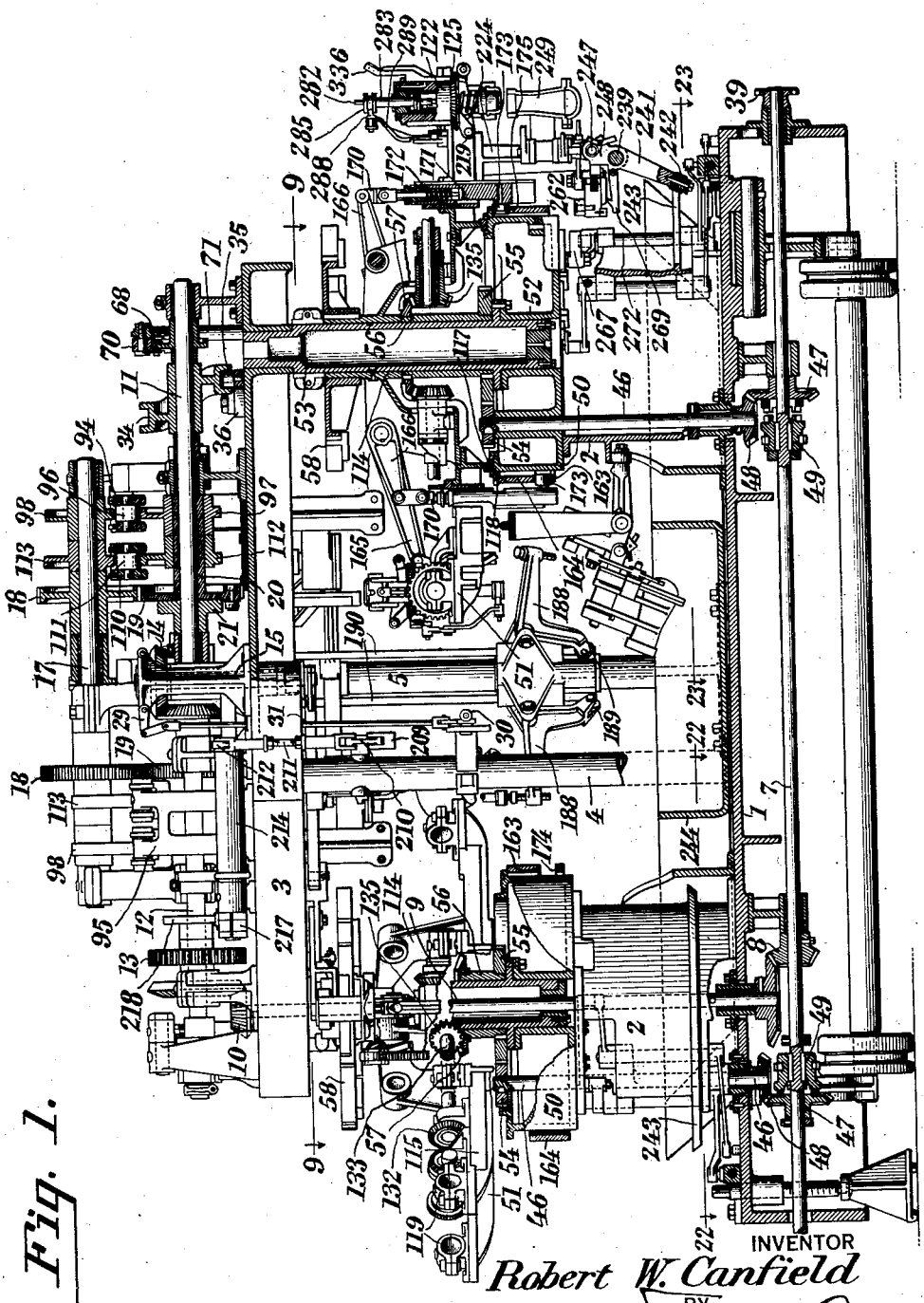
Figure 1 is a view of a glass working machine embodying my invention, looking at the unloading side thereof, parts being broken away and other parts being in section or omitted for clearness.
Figure 29:
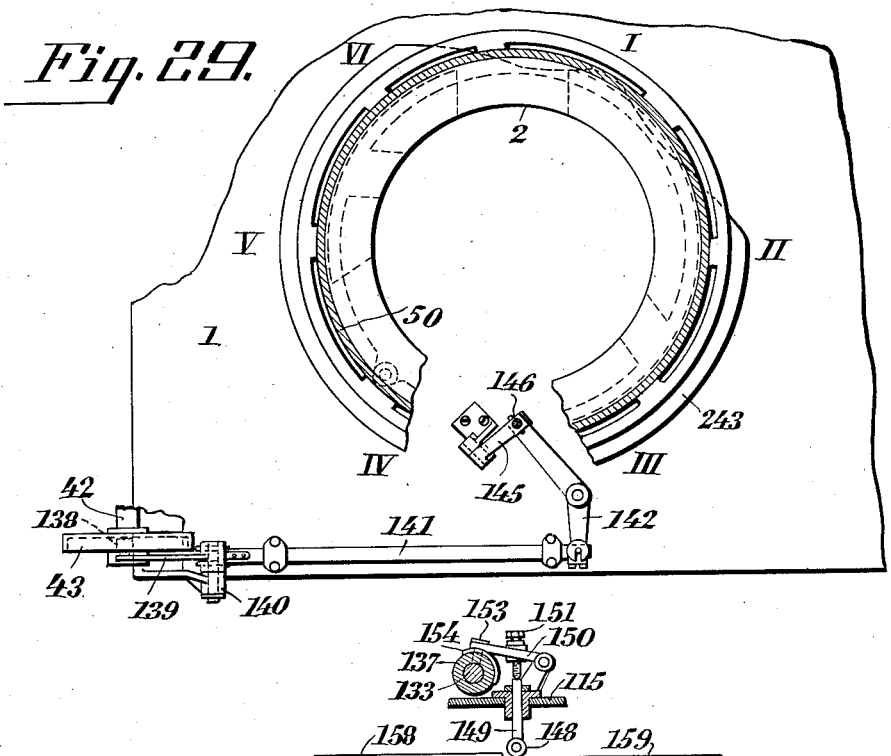
Figure 28:
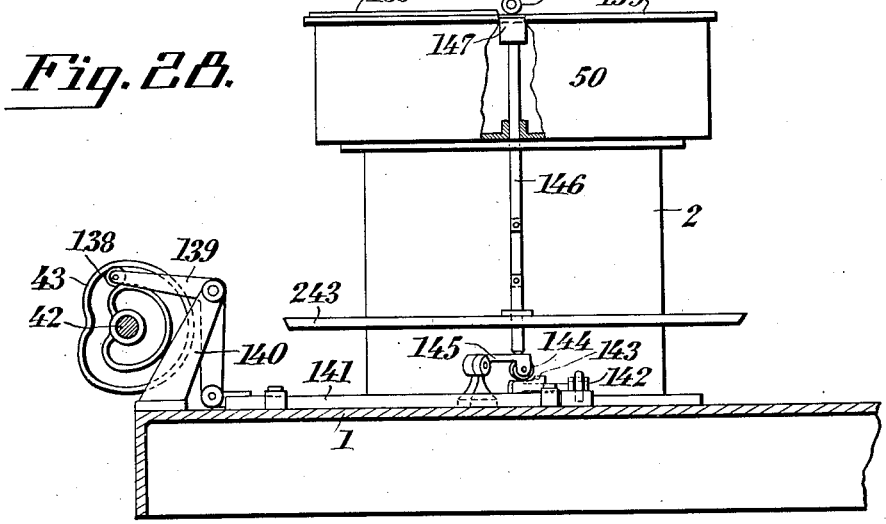

Figs. 22 and 23 are horizontal sections taken respectively on the lines 22—22, and 23—23 of Fig. 1, showing the driving mechanism of the machine;

Fig. 24 is a vertical transverse section taken on the line 24—24 of Fig. 23, illustrating the necker operating mechanism;

Fig. 25 is a detail plan view of the parts shown by Fig. 24;

Fig. 26 is a vertical transverse section taken on the line 26—26 of Fig. 23, illustrating the mold-closing mechanism;

Fig. 27 is a plan view of the parts shown by Fig. 26;

Fig. 28 is a vertical transverse section taken on the line 28—28 of Fig. 23, illustrating the spindle clutch operating mechanism;

Fig. 29 is a plan of the parts shown by Fig. 28;

Fig. 30 is a plan view of the unloading mechanism;

Fig. 31 is a side elevation of the unloading mechanism, as seen from the line 31—31 of Fig. 30;

Fig. 32 is a diagrammatic view showing a development of the spindle-inverting, and the spindle clutch-actuating cams;

Fig. 33 is a diagrammatic view of the several spindles at the stations comprising the cycle of one machine unit, one spindle of the other unit also being shown;

Figs. 34, 35, and 36 are series of positional views illustrating the formation of the blank by the press plunger.

The invention herein illustrated is shown as embodied in an automatic machine having two complete and counterpart machine units mounted on the same base and coordinately driven. With such duplex machine is associated a feeding mechanism adapted to feed glass in the form of gobs or separated charges to the two machine units in alternation whereby the feeder may be run at high speed. Obviously, my invention would also be embodied if a single machine unit were employed and the feeder delivered the glass to it only. With the machine unit, or units, is associated an actuated mechanism for arresting the delivery of glass to a machine unit when desired.

Each machine unit, as in the patent before named, comprises a pressing mechanism with which a series of sub-units (in the instant case six) are adapted to be successively brought into co-operative relation by a stepping motion imparted to such sub-units. Each sub-unit, as in the afore-mentioned Letters Patent, comprises a glass-carrying spindle, a mold mechanism, and a necking structure, with means for actuating a plunger to form the initial cavity; for admitting air into glass carried by the spindle; for rotating the spindle around its longitudinal axis and for inverting it around its horizontal axis; for opening and closing the neck rings forming a part of the spindle; for opening, closing, dipping, and raising the mold; and for actuating the necker at desired times.

In the instant case the sub-units are all mounted upon a spider which is put in intermittent movement for stepping the units through a complete cycle and for holding them stationary in the path of travel at selected points which will be hereinafter designated as stations. In co-operative relation with the spindle at station I, is the pressing mechanism.

In addition to the above, the machine herein shown comprises:—

Improved construction of pressing mechanism and receiver whereby the plunger is driven, and the receiver is seated on the co-operating spindle through a cushion, although such movements are actuated from a shaft driven in desired time relation. The control of the several clutches through which the spindles are put in rotation prior to blowing by a tappet member worked from a driven shaft whereby each spindle rotating clutch may be actuated while the associated spindle is stationary at one of the stations. Automatic actuation of the neck rings from a time-driven shaft whereby each neck ring may be actuated while its sub-unit is stationary, together with improved mechanism for opening and closing the neck rings.

Improved construction for forcing puff air into the blank comprising a positive displacement pump contained at the end of each spindle and actuated from a fixed cam during the travel of the sub-unit of which such a spindle forms a part.

Improved construction whereby blowing air at a relatively low pressure is provided in a reservoir adjacent to each spindle, the admission of such blowing air to the spindle being controlled by novel means. This reduces irregularities in air pressure frequently met with when low pressure air is fed through long and relatively small pipe lines.

A construction wherein closing of the molds is due to the power applied from a timed driven shaft. This permits the closing of a mold while the sub-unit of which it forms a part is stationary, and by proper adjustment in the mold-closing driving-mechanism permits a shift of time of the closing of the mold and the consequent admission of blowing air to allow a variation to be effected in the period of elongation of glass to suit temperature conditions, etc.

A construction wherein the neckers are actuated from a time driven shaft whereby each necker can be brought into operation while its unit is stationary.

A construction of driving mechanism for two machine units. By preference the machine units are alternately stepped in opposite directions, as this permits the loading positions of the two units to be brought close together thereby reducing the throw of the feeding trough necessary to deliver glass to the two loading positions, and this permits the machine to be close to the supply of glass.

The machine base 1 supports right and left-hand vertical columns 2, which carry at their upper ends a horizontal frame 3. The frame is also supported by vertical columns 4, 5 and 6, these columns serving also as supports for other instrumentalities to be hereinafter more fully described. Power is applied to both machine units through a drive shaft 7 which extends horizontally from side to side under the base 1.

As the blank forming presses, glass-carrying spindles, molds, and their actuating mechanisms of the two units are similar, only those for one unit will be hereinafter described in detail. However, it is to be understood that the complete duplex machine is shown in certain figures of the accompanying drawings, and the similar parts common to both units of the machine are referred to by the same reference characters.

Figure 2:
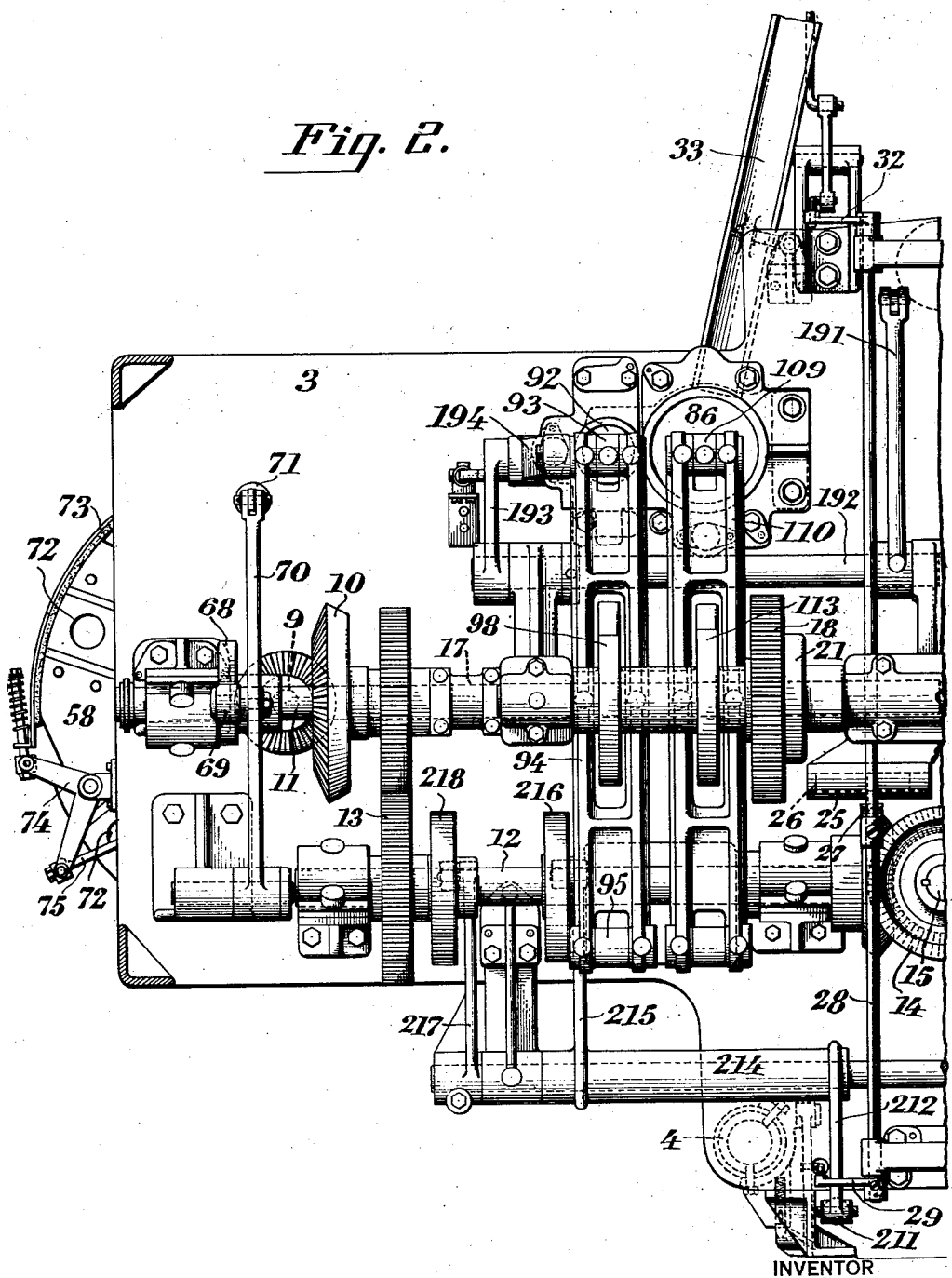
Figure 4:
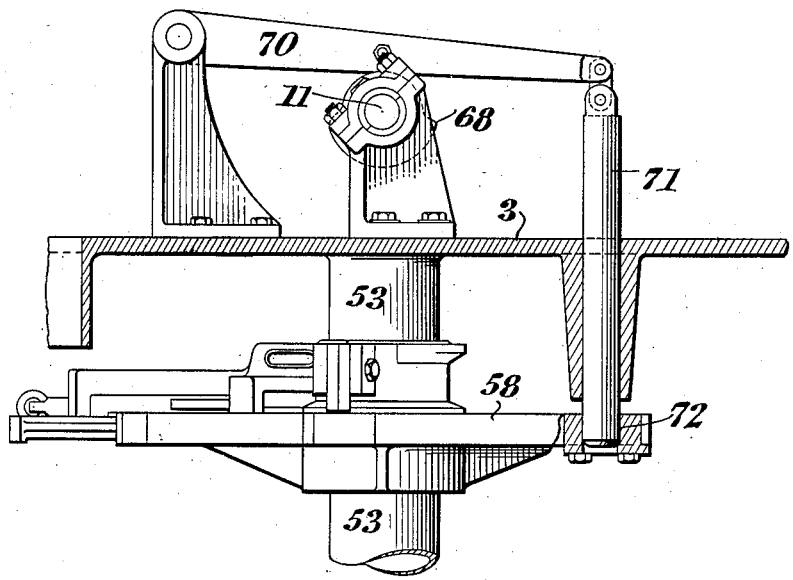
Fig. 4 is a vertical section taken on the line 4—4 of Fig. 2A, illustrating in detail the spider-locking mechanism.
Figure 5:
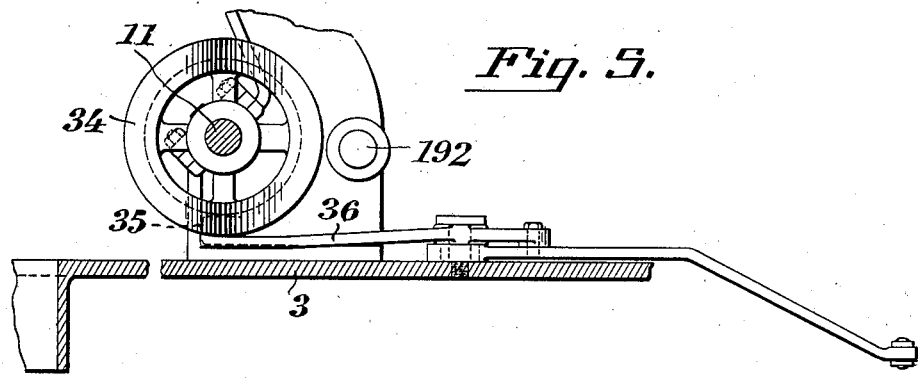
Fig. 5 is a vertical section taken on the line 5—5 of Fig. 2A, illustrating in detail the trough-swinging mechanism.

*The driving mechanism.* (*Figs. 1, 2, 2ᴬ, 4, 5, 6, 7, 8, 9, 10, 22 and 23.*)

The main drive shaft 7 is connected by gearing 8 to a vertical shaft 9, which latter extends upwardly through the center of the left-hand column 2, where it is connected by gearing 10 to a horizontal shaft 11 mounted on and extending across the top of the upper frame 3. Left and right, as here referred to, have reference to the left and right of an observer facing the unloading side of the machine.

Another horizontal shaft 12 is mounted on the upper frame 3, in front of the shaft 11, being driven therefrom by means of gearing 13 (Fig. 2). The shaft 12 is located only on the left-hand side of the frame 3, and its end near the center of the machine is connected by miter gearing 14 to a vertical shaft 15 which extends downwardly through the upper horizontal frame 3, and has mounted on its lower end a crank 16. The purpose of the crank will be hereinafter more fully described.

Mounted above the shaft 11, and in alignment therewith are horizontal shafts 17 on the right and left-hand of the center of the machine respectively. Gears 18 mounted on the shafts 17 mesh with gears 19 carried by sleeves 20 loosely mounted on shaft 11.

A clutch driver 21 is keyed to the shaft 11 adjacent to each of the gears 19, and each clutch driver is provided with a notch 22 that is adapted to receive the inturned end 23 of a pawl 24 pivotally mounted on the adjacent gear 19 (see Fig. 8), the inturned end of the pawl being held in the notch 22 by means of a spring S. Carried in a boss 25, adjacent to each gear 19 is a slidably mounted pin 26 adapted to be projected into the path of the tail of the pawl 24 when the latter is in locking position. The pins 26 can be independently actuated to engage or disengage the clutch drivers 21. For this purpose each pin 26 is connected to a lever 27 mounted on a rod 28, which latter has fixed to its outer extremity a crank 29, connected to an operating handle 30, by means of a vertical rod 31 mounted on the front of the machine. There is a clutch-operating mechanism of this construction for each unit of the machine.

The rods 28 of the clutch mechanism extend to the rear or loading side of the machine where each is linked by suitable means 32 to troughs 33 (delivering charges of molten glass to the corresponding machine unit) for the purpose of moving each trough 33 in or out of registration with the feeding mechanism with which the machine is to be associated.

Fixed to the shaft 11, near the right-hand end thereof is a cam 34 which co-acts with a roller 35 of an intermediately pivoted arm 36 swingingly mounted on the top of the upper horizontal frame 3. The opposite end of the arm 36, is connected as at 37 to means for swinging the main delivery trough 38 of the glass delivering and feeding apparatus. The cam 34 is so designed that the trough 38 will be moved to alternately deliver charges of glass to the unit troughs 33 (see Figs. 2ᴬ, 3, and 5).

The outer or right-hand end of the main drive shaft 7, has fixed thereon a sprocket 39 which is connected by means of a chain 40, to a sprocket 41, on the right-hand end of a horizontal shaft 42 mounted on the front of the base 1. The shaft 42 extends the entire length of the machine, and near each of its extremities are fixed cams 43, 44, and 45, for respectively actuating the spindle clutch mechanism, the mold-closing mechanism, and the necker mechanism of the corresponding machine units.

Extending upwardly into each of the columns 2 and eccentrically thereof is a shaft 46 which is connected to the main drive shaft 7 by means of bevel gears 47 and 48, the gear 47 being loosely mounted on the drive shaft 7. A suitable clutch mechanism 49 is provided for each of the gears 47. When the clutches are disengaged no motion will be transmitted to the vertical shafts 46. The clutches 49 are independently actuated whereby the rotation of shafts 46 of either unit can be controlled.

Each of the columns 2, is hollow and comprises a base portion having on its upper end an enlarged portion 50 in the form of a bearing surface, on which is rotatably mounted the sub-unit carrying spider 51. A tubular extension 52 projects upwardly inside of each portion 50, and fixed to the top of this extension is the top portion 53 of the corresponding column 2, on which the upper horizontal frame 3 is supported.

On the upper end of each of the shafts 46, and on top of the portion 50 of the column, is mounted a spur gear 54 which meshes with a gear 55 fast on a sleeve 56 mounted on the portion 53 of the column. The sleeve 56 has fixed to its upper end a beveled gear 57, the purpose of which will be hereinafter more fully described.

Referring to Figs. 9 and 10, each of the sub-unit carrying spiders 51 has fixed to its upper portion a driving disk 58, which is provided with a series of peripheral notches 59, corresponding in number to the number of sub-units in each machine unit. Sleeved on the upper portion 53 of each column 2, above the disk 58, are ratchet arms 60. The two ratchet arms are connected by means of links 61 to the opposite ends of a yoke arm 62. Each link 61 is connected to an intermediate portion of the corresponding ratchet arm 60 by means of a pin 63 surrounded by an eccentric bushing 64, which can be angularly adjusted to take up lost motion in the ratchet mechanism. On the outer ends of the arms 60 are pivotally mounted pawls 65, which are adapted to engage with the notches 59 of the disks 58, the pawls 65 being retained in position by means of springs 66.

The pawls 65 on the two arms 60, are so arranged that they will, when actuated, alternately rotate the disks 58 in opposite directions. The central portion of the yoke arm 62 is transversely slotted, in which slot slides a block 67 pivoted on the crank 16 on the lower end of the shaft 15.

Fixed adjacent to each end of the shaft 11 are cams 68. Riding upon each of the cams is a roller 69 mounted on the intermediate portion of a horizontally disposed arm 70. The arm is pivotally supported on the horizontal frame 3, and has its outer end jointed to a vertical rod 71 that is slidably mounted in the frame 3, as shown by Figs. 2, 2ᴬ, and 4. Formed between the peripheral notches 59, of the driving disks 58 are perforations 72 which are adapted to be brought successively into registration with the vertical rod 71 by the spider stepping mechanism hereinbefore described, whereupon the arm 70 will be lowered on its pivot (through the rotation of the cam 68 on shaft 11) thereby inserting the lower end of the rod 71 into the corresponding perforation and thus locking the disk from further movement.

Each driving disk 58 is adapted, when rotated by the action of the pawl 65, to have its rotary movement retarded by means of a brake. In the present case the brake comprises a band 73 that surrounds a portion of the periphery of the disk 58, one end of the brake band being suspended from the horizontal frame 3 by means of a vertical stud, while its other end is resiliently fastened to a bell-crank 74 that is pivotally mounted to a bracket secured to the end of the frame 3. Connected to the free end of the bell-crank lever 74 and passing through an opening 76 in the ratchet arm 60 is a rod 75. This rod is preferably slidably mounted in the opening 76 and has its free end headed as shown in Fig. 9.

When the driving disk is stationary and its ratchet arm is swung rearwardly previous to the next forward movement of the disk, the brake-band 73 will be disengaged from the periphery of the disk. As the ratchet arm commences to move forwardly, such movement will not affect the brake-band, for the head of the rod 75 will not be positioned against the side of the ratchet arm. However, on further movement of the ratchet arm, the rod 75 will be drawn therewith, due to the fact, that the head of the rod is now engaged with the side of the ratchet arm, and this movement will draw the brake-band towards the periphery of the disk, such drawing continuing during the swinging movement of the ratchet arm, until the brake-band has been drawn tight against the disk at the end of the stroke of the ratchet arm.

For the purpose of disengaging the pawls 65 from the notches 59 of the disks 58 of the two machine units, so that motion imparted to the spiders 51 of each unit from the continuously rotating shaft 15 may be independently controlled, the outer ends of the arms 60 have mounted thereon latches 77. The latches 77 are substantially L-shaped and they are pivotally mounted in extensions 78 of the arms 60. In Fig. 9, the latches 77 are shown out of engagement with the pawls 65, and when the latches are in such disengaged position, the pawls will so function that the disks 58 will be driven from the crank 16.

When it is desired to stop either of the machine units while the main drive shaft 7 is being driven, the operator grasps the handle on the outer end of the latch 77 of the unit to be stopped, and then swings the handle to cause the latch to press against the outer extremity of the pawl 65. This will swing the inner end of the pawl 65 out of the notch 59 of the disk 58 in which it was engaged. When the latch 77 is moved as just described, the locking-pin 79 of its handle will drop over the edge of the outer end 78 of the arm 60, and in this manner retain the pawl out of engagement until the operator again swings the handle of the latch 77 to the position illustrated.

*The blank forming mechanism. (Figs. 2, 2ᴬ, 3, 6, 7, 8, 11, 12, 12ᴬ, 13, 34, 35, and 36.)*

The blank forming mechanisms, comprising a glass receiver, a plunger and actuating mechanisms for each machine unit, are carried by the upper horizontal frame 3 in apertures 80 therein, over the loading position of the glass-carrying spindles of that unit. The blank forming mechanisms are similar (except for certain reversals of parts), and in the following description the mechanism for only one unit will be described.

Referring to Figs. 3, 6, 11, 12, 12ᴬ, 13, 34, 35, and 36, the glass receiver 81 of the blank-forming mechanism is mounted in a horizontal frame 82 on a piston rod 83, and sliding in a guide 84 depending from the frame 3, the upper portion of the guide 84 carrying a guide 85 for a press cylinder 86.

The glass receiver is provided with a central vertical aperture 87 that is coextensive with the height of the receiver. Surrounding the aperture 87 is an annular hollow chamber 88 which is formed in the walls of the receiver for the purpose of retaining a liquid, the bottom of the chamber being closed by means of a plate having a beveled central opening 89 that is adapted to be seated on the top of the spindle as will be hereinafter described. As the heat of the hot glass is absorbed by the receiver, the purpose of forming the receiver as above set forth, is to provide means for maintaining the walls of the receiver at an even and moderate temperature during the operation of the machine.

The upper portion of the receiver 81 is notched as at 90 (Figs. 3 and 34). The notch 90 is so formed that it will align with the glass-delivery trough 33 of the corresponding machine unit when the receiver is lowered, whereby the glass will be deposited on top of the glass-carrying spindle, as will be hereinafter more fully described.

Mounted in the aperture 80 and fixed to the frame 3 is a guide 91 for the cylinder 92 surrounding the glass-receiver operating piston rod 83. The top of the cylinder 92 has pivoted thereto the lower end of a link 93. The link 93 is pivotally connected to one end of a lever 94, the other end of the lever 94 being pivoted in a bracket 95 on the top of the frame 3 near the front edge thereof (see Fig. 6).

The lever 94 carries a roller 96 which is between and is alternately moved by cams 97 and 98, the former being positioned below the lever 94, while the latter is positioned above the lever 94. The cam 97 is mounted on the sleeve 20 on shaft 11, while the cam 98 is mounted on shaft 17. The purpose of cam 97 is to raise the glass receiver, while the purpose of cam 98, is to lower the glass receiving mechanism, as will be hereinafter more fully described.

The piston rod 83 extends upwardly into the cylinder 92 and terminates in a piston which is normally held depressed by air contained in the cylinder. This air is kept at more than atmospheric pressure by air supply from the supply pipe 99 through the stuffing box 100.

Mounted in the guide 85 is the press cylinder 86 containing a vertically-moving piston rod 101 and piston head 102. The piston head 102 is normally held at the lower end of its stroke by the air contained in the cylinder 86. This air is kept at more than atmospheric pressure by air supply from a supply pipe 103, connected to the cylinder by a stuffing box 104.

The lower end of the piston rod 101 carries a cup-shaped press plunger 105 which has an external diameter adapting it to slide snugly within the glass receiver 81, and has an internal cavity of the size desired for the exterior of the blank to be pressed. The upper part of the plunger 105 may be made hollow as shown in Figs. 12 and 12ᴬ, so as to provide a space in which a cooling fluid can be circulated. The plunger 105 has a port 106 therein extending from its outside to the top of the cavity, at which latter point is located a headed valve-stem 107, which by pressure of a spring 108 may be forced down thus unseating the port.

Thus on the plunger descending upon the glass contained in the glass receiver 81, the trapped air is allowed to escape through the port 106, and the glass to fill the entire cavity. When this has taken place, the valve 107 is lifted by the glass and the aperture closed, thus preventing the clogging of the same by glass extruding therein.

Pivotally mounted to the top of the plunger cylinder 86 is the lower end of a link 109, the upper end of the link being connected to one end of a horizontally disposed lever 110. The other end of the lever 110 is pivoted to the bracket 95 on top of the frame 3 in which is also pivoted the lever 94 of the glass-receiver operating-mechanism.

Figure 7:
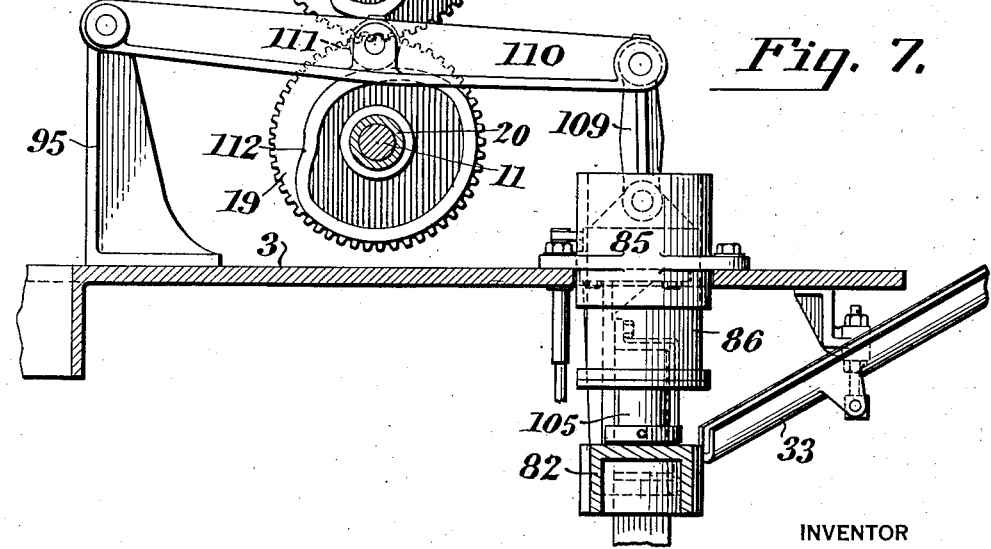
Fig. 7 is a vertical section taken on the line 7—7 of Fig. 2A, illustrating the press-plunger mechanism.

The lever 110 (Fig. 7) carries a roller 111 which is between and is alternately moved by cams 112 and 113, the former being positioned below the lever 110 and mounted on the sleeve 20 on shaft 11, while the cam 113 is positioned above the lever 110, being mounted on shaft 17. The purpose of cam 112 is to raise the cylinder 86 and the press plunger 105, while the purpose of the cam 113 is to lower the press-plunger mechanism.

*The glass-carrying spindle.* (*Figs. 1, 14, 16, 20, 21, 34, 35 and 36.*)

The sub-unit carrying spider 51 comprises a hub 114 surrounding the upper portion 53 of the column 2, and a web 115 fastened to the hub by bolts 116. The web has on its lower side an annular bearing surface 117 which rides upon the upper annular track 118 of the portion 50 of the column 2, a film of oil being interposed between the two to reduce friction.

Notches are formed in the periphery of the web 115, and on each side of each notch is a bearing 119. Each pair of such bearings receives the trunnions 120 and 121 of a ring 122 of the spindle. In the central recess of the ring 122 is located a sleeve 123, one end of which receives a nut 124, and the other end of which is formed into a miter gear 125.

The first-named end of the sleeve 123 will hereinafter be termed "the lower end" and the other "the upper end", and this nomenclature will apply to parts carried by the sleeve, although the spindle ring 122 and sleeve 123 pivoted in the trunnions radially of the spindle, move from an erect to an inverted position to reverse the conditions above stated.

Threaded into the upper portion of the sleeve 123 of the spindle (see Fig. 21), is a tube 178 held by a lock nut 179, and having at its upper end an enlarged portion 180. Mounted in the tube 178 is a plunger 181 having on its upper end, positioned in the enlarged portion 180, a domed-head 182 of proper shape to give the desired configuration to the internal cavity of the blank. By preference, this head is made removable in order to accommodate machines to different styles of blanks. Surrounding the plunger 181 is a spring 183 which is positioned in the tube 178 between a bushing 184 threaded into the top of the tube 178, and a collar 185 secured to the stem of the plunger 181 by means of a pin. The purpose of the spring is to retract or withdraw the plunger. The plunger is provided on its periphery with vertical grooves 186, and the enlarged portion 180 of the tube 178 is internally grooved at 187, such last named grooves not extending to the top of the tube. The purpose of the grooves 186 and 187 is to permit passage of air upwardly through the spindle when the plunger is retracted.

The plunger 181 projects through the bottom of the spindle and it is adapted to be lifted, when the sub-unit is in pressing position (station I), by the free end of a bell-crank lever 188 carried by a bracket on the standard 5 (Fig. 1). The other end of the lever 188 carries a roller 189 which is engaged by the lower wedge-shaped end of a vertical rod 190, the upper end of the rod being linked to a rocker arm 191 on top of the frame 3. (See Figs. 2, 2ᴀ, and 8.)

Figure 6:
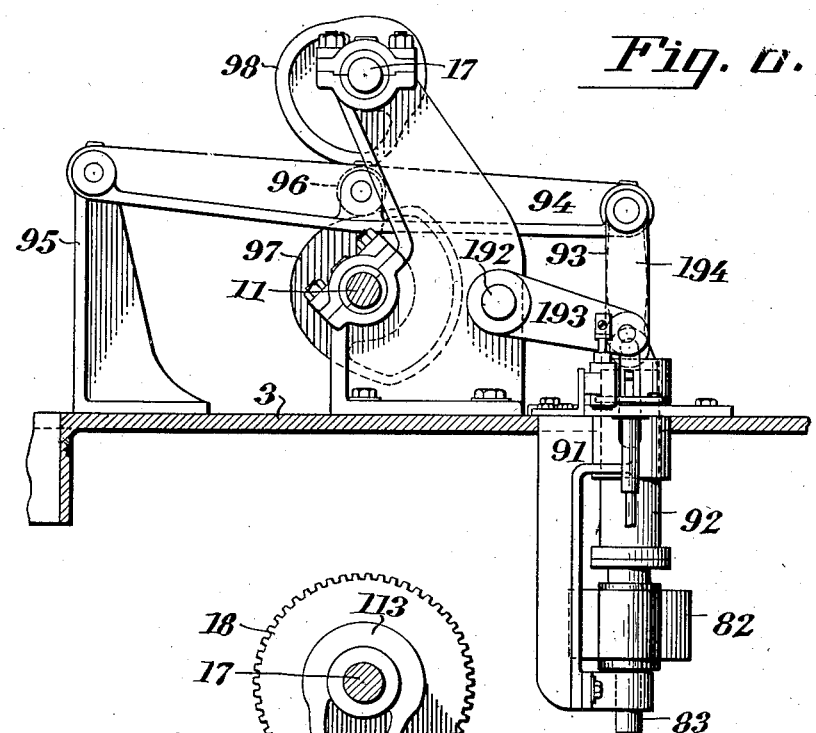
Fig. 6 is a vertical section taken on the line 6—6 of Fig. 2A, illustrating the glass-receiving mechanism.

The rocker arm 191 is keyed to one end of a rocker shaft 192 horizontally mounted above the frame 3 beneath the arms 94 and 110, the opposite end of the shaft carrying another arm 193 which is connected by a link 194 to arm 94 (see Fig. 6). Therefore, it will be understood, that when the arm 94 is actuated to lower the glass receiver 81, the rod 190 will also be forced downwardly, thereby swinging the free end of the lever 188 upwardly, and this will raise the plunger 181 so that its head 182 will be moved to the top of the tube 180, the head 182 remaining raised during the period that the glass receiver 81 is lowered, and when the latter is raised the plunger 181 will be lowered by the spring 183.

Surrounding the upper end of the tube 178 is a follower-ring 195 that is normally pressed upwardly by a spring 196. Formed on the follower 195, near the bottom thereof, is an internal bead 197 which abuts against the enlarged portion 180 of the tube 178, while the exterior of the lower portion of the follower 195 is enlarged, as at 198.

The neck-ring carrier 199 consists of two halves, each half having depending from the lower surface thereof a bifurcated leg 200, forming a bearing, the axis of which is parallel to the line of division of the carrier, and are sufficiently separated to fit around the upstanding ears 201 on the top surface of the sleeve 123, being pivoted to such ears by the pins 202. Each pivot 202 also carries between the ears 201, a neck-ring closing lever 203, which is adjustably attached to the neck-ring carrier 199 by means of threaded rods 204. The lever 203 is provided with upper and lower cam faces 205 and 206, the former of which is engaged by arms of a U-shaped lever 207 pivotally mounted in ears 208 projecting from the upper portion of the sleeve 123. Each of the levers 207 may be swung downwardly (the spindle being inverted at the time) by a foot 209 carried on the inner end of a lever 210 pivoted to the columns 4 and 6 (Fig. 8) and adjacent to station VI. The lever 210 is pivoted to the lower end of a vertical rod 211, the upper end of the rod being connected to a lever 212.

Referring now to Figs. 2, 2ᴀ and 8, it will be noticed that there is a lever 212 for each unit of the machine, the lever 212 for the right-hand unit being mounted on a shaft 213 carried by brackets on the upper horizontal frame 3, while the lever 212 for the left-hand unit is mounted on a sleeve 214, carried by the shaft 213. The sleeve 214 has extending therefrom an arm 215 which has mounted on its extremity a roller that runs in a cam 216 on shaft 12, while the shaft 213 has extending therefrom an arm 217 which has mounted on its extremity a roller that runs in a cam 218 on shaft 12.

When a spindle is brought to station VI (the ejecting position) during the cycle of operation of the machine, the foot 209 is swung downwardly through the means just described and engaging with roller 219 on the end of lever 207, opens the associated neck-ring.

The lower cam face 206 of each lever 203 is engaged by the arms of the U-shaped lever 207 when the roller 219 of the lever 207 is depressed by a foot 220 carried by the frame 82 of the glass receiver 81, when the spindle is in loading position (station I). This closes the neck-ring, (see Fig. 36). A spring 221 mounted on the pivot of the U-shaped lever 207 serves the purpose, by means of friction created thereby, of preventing the two halves of the neck-ring carrier 199 from opening beyond the required amount between the ejecting and loading positions. If for any reason the follower 195 is not returned to normal position by the spring 196, after the ejection of the article, the arms of the U-shaped lever 207 will, when the latter is lifted at the loading position, engage the follower thereby forcing it to normal position.

Seated within the neck-ring carrier 199, is the neck-ring 222, this also being made in two parts, divided in the same plane as the neck-ring carrier, each of the parts of the neck-ring being removably secured to the corresponding part of the carrier in any suitable manner. The neck-ring is so mounted that when its parts are closed it surrounds and projects above the upper part of the follower 195, and so that when the spindle is erect and in loading position and the glass receiver 81 is down, the upper end of the neck-ring 222 is sealed against the lower surface of the glass receiver 81, the upper outer edge of the ring being beveled to make a close joint therewith. An inturned flange 223 is formed at the top of the ring slightly above the top of the follower 195. Thus the upper parts of the neck-ring form a downward continuation of the glass receiving cavity and the bottom of such cavity is formed by the spindle parts.

*The spindle rotating means.* (*Figs. 1, 14, 16, 20, 21, 22, 23, 28, 29, 32, and 33.*)

The spindles are adapted to be rotated at intervals during the cycle of operation. For this purpose, the miter gear 125 of each spindle is driven from the beveled gear 57 by independently actuated gearing, it being understood that while the gear 57 may at times be constantly in motion, the gearing for rotating the spindles will only be intermittently in motion.

The gear 125 meshes with a miter gear 126 fast to a spur gear 128 carried by a bushing 127 keyed to the trunnion 120. The spur gear 128 meshes with a gear 129 carried by a bracket 130 that is mounted on the web of the spider (see Fig. 14). Fast to the gear 129 is a beveled gear 131 which meshes with another beveled gear 132 fast on the outer end of a horizontal shaft 133 mounted in a bearing bracket 134. The shaft 133 has sleeved on its inner end a beveled pinion 135 which meshes with the beveled gear 57, the drive of which has been described. The sleeve 136 carrying the beveled pinion 135 is at times locked to the shaft 133 by a clutch 137, whereby the rotation of the sleeve 136 is imparted to the spindle sleeve 123 through the gears 132, 131, 129, 126 and 125, to turn the latter in the spindle bearing formed by the ring 122.

For the purpose of actuating the clutch 137 at desired times during the cycle of operation of the machine, the cam 43, which is mounted on shaft 42, as previously described, is provided with a groove in which travels a roller 138 carried by one arm of a bell-crank lever 139 pivotally mounted in a bracket 140 on the base 1, as shown by Figs. 22, 23, 28 and 29. To the opposite end of the bell-crank lever is connected one end of a slide-bar 141, mounted on the base 1. The opposite end of the slide-bar is connected to one end of a bell-crank lever 142 which is pivoted to the base 1. The other end of the lever 142 has formed thereon a cam face 143, which is engaged by a roller 144 carried by a vertically movable rocker arm 145, which is mounted on a bracket secured to the base 1. The position of the parts just described is such that the free end of the rocker arm 145 is positioned beneath the enlarged portion 50 of the column 2.

Carried by bearings fastened to the column 2 is a vertically sliding rod 146 having its lower end resting upon the free end of the rocker arm 145, and its upper end positioned inside of the enlarged portion 50 of the column 2 and adjacent to the upper annular flange of the portion 50. The top of the rod 146 is provided with a tappet head 147, which is so angularly located around the column 2 that it underlies the path of travel of a series of rollers 148 carried by the spider, and is under the roller which is associated with that spindle which is what is hereinafter designated as station IV. Each of the rollers 148 is on the lower end of a push rod 149, vertically movable in and carried by the spider adjacent to each spindle.

An arm 150 is pivotally mounted over the top of each rod 149, an adjusting screw 151 being carried in the arm and being retained in contact with the top of the rod 149 by means of a spring 152. The outer end of the arm 150 is provided with a downwardly extending pin 153, which is adapted to coact with a peripheral cam-face 154 on the clutch-sleeve 137.

The sleeve 137 slides on the shaft 133 and its inner end is provided with a plurality of pins 155 which are adapted to engage in recesses 156 on the hub of the pinion 135. Surrounding the shaft 133 at the outer end of the sleeve 137 is an expansion spring 157.

When the rod 149 is raised it will in turn raise the arm 150 and thereby lift the pin 153 free from the cam-face 154 of the clutch-sleeve 137, whereby the clutch-sleeve will be slid rearwardly by the expansion of the spring 157 and engage with the pinion 135 whereupon the spindle will be rotated on its longitudinal axis (i. e. the axis at right angles to the trunnions).

The movement of the roller 148 from off the tappet head 147 in the travel of the spider in moving from station IV will cause it to run along a raised portion 158 of the circular track 159 on the top portion 50 of the column 2. This raised portion continues adjacent to what is designated as station VI. On reaching the end of the raised portion, the roller 148 drops slightly to the drop portion 160 of the track, thereby causing the spindle-rotating clutch to be disengaged, due to the lowering of the pin 153, permitting thereby a consequent camming-action on the sleeve 137, due to the cam 154 thereon, and to the rotation of the sleeve at that time. When the roller 148 moves from station I, it rides up on the raised portion 161 of the track, and the clutch is again engaged to rotate the spindle, and the roller continues on this raised portion until it is close to station IV, when the roller again drops, this time onto the portion 162 of the track upon which it continues until it again sets over the tappet head 147.

*The spindle inverting means.* (*Figs. 1, 14, 16, and 32.*)

The mechanism for inverting the spindles consists of a peripheral double-walled cam 163 that is formed in the side walls of a drum 164 surrounding and fixed to the portion 50 of the column 2. This cam serves as the actuator for turning the spindles on their trunnions, and for actuating the spindles through mechanisms individualized for each sub-unit. The spindle-inverting mechanism also comprises a forked lever, pivoted on the spider, and consisting of a long arm 165 and a short arm 166. The long arm 165 is pivoted to a vertical rack 167, slidably mounted in a guide 168 fixed to the spider near the periphery thereof, the rack meshing with a gear 169 fast on the spindle trunnion 121.

The short arm 166 on the forked lever has pivoted thereto the upper forked end of a vertical link 170. The link 170 has its lower end also forked, and connected to a slide rod 171 mounted in a guide 172 fastened to the spider, the rod 171 carrying at its lower end a roller 173 running in the cam 163.

The cam 163 is provided with a lower run 174, an upper run 175, and an intermediate run 176, inclines 177 connecting adjacent runs. The roller 173 is in the lower run 174 when the spindle with which it is associated is in pressing position (station I) and the spindle will be erect. During the cycle, after the spindle leaves the pressing position, and before it reaches the final blowing position, the roller 173 will move into the upper run 175 and the spindle will be inverted. After a spindle leaves the last blowing position and before it again reaches station I, the roller 173 will move into the intermediate run 176 at station VI, and the spindle will be moved on its trunnions so that its axis will be inclined about 30 degrees to vertical, the upper end being still down.

*The necker.* (*Figs. 14, 16, 22, 23, 24 and 25.*)

Adjacent to each spindle, beneath the spider 51, and carried in projections from mold supporting brackets 224, is a vertical rocker shaft 225 on which is sleeved a tail member 226 and a head member 227. Sleeved on the shaft 225 is the necker-bar 228, a spring 229 being interposed between an intermediate portion of said bar and the head 227. The movement of the necker-bar under the influence of the spring, and away from the head, may be limited by means of the screw 230 carried by the head and taking into a pivoted block 231 carried on the lower surface of the necker-bar.

A bar 232 is mounted to slide outwardly in bearings carried by the lower surface of the portion 50 of the columns 2, the position of this bar angularly of the column being such that when projected it is adapted to strike the tail 226 of the necker associated with the spindle which, at that time is what is hereinafter designated station III. The inner end of the bar 232 is connected by a link 233 with the outer end of a crank 234 of the rocker shaft 235, the lower crank 236 of which is actuated from a slide rod 237 driven by the bell-crank lever 238 working in the cam 45 on the shaft 42, hereinbefore described. The necker-bar 228 is at such elevation that it is immediately beneath the end of the associated spindle when the latter is inverted, and is adapted, as will be hereinafter described, to work a blank depending from such spindle.

*Mold mechanism.* (*Figs. 1, 16, 17, 18, 19, 22, 23, 26, 27, 28 and 29.*)

Depending from the periphery of the spider 51, radially in line with each of the pair of spindle brackets or bearings 119, are brackets 224 for supporting the mold for the corresponding spindle. The lower end of the brackets 224 have fixed therein a horizontal shaft 239 on which is revolubly mounted a sleeve 240 having a downwardly extending arm 241 terminating in a roller 242 running upon a track 243 formed on the column 2 above the base 1, the track being so shaped that the mold will be tilted downwardly (the sleeve 240 turning on shaft 239) during the period that such mold is between stations VI and II.

In the rotation of the spider around the central column 2, the track 243, which is properly shaped therefor, will at times cause the mold, carried on each of the mold carriers to be erect and beneath and in line with the associated spindle, and will, at other times, lower such mold into the water trough 244 also mounted on the base 1, this lowering of the molds into water being usual in paste-mold blowing machines.

A pin 245 that is carried by a yoke 246 mounted on a transverse pin 247 in a lug 248 projecting upwardly from the sleeve 240, receives the two halves of the blow-mold 249, and serves as the pivot pin therefor. The pin 245 is retained in erect position by means of a latch 250 engaging a lug 251 formed on the yoke 246 (Fig. 19).

Figure 17:
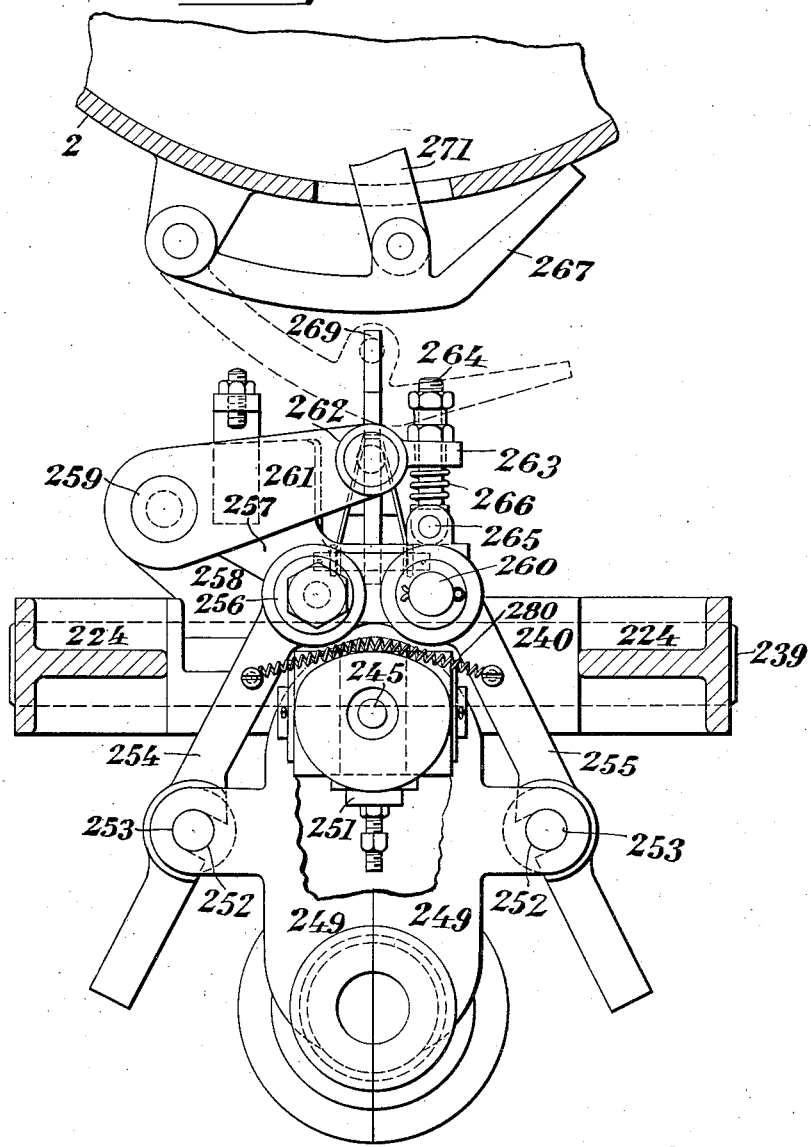
Fig. 17 is a section taken on the line 17—17 of Fig. 16 showing the blow-mold and its associated parts in plan, the mold being shown closed.

Each of the mold halves 249 has lugs in which are mounted depending pins 252 that are received in notches 253 formed intermediate the length of links 254 and 255, the free end of the links extending beyond the notches, to provide handles by means of which the links may be separated to remove the mold from its mounting. A spring 280 connects both links as shown by Figs. 17 and 18 for the purpose of retaining their notches engaged with the pins 252. The link 254 is pivoted on an eccentric bushing 256 secured to a lever 257 carried by a projection 258 on the rear side of the sleeve 240, the lever 257 being pivoted to the projection 258 by means of a pin 259. The link 255 is connected to the lever 257 by means of a pin 260.

Also carried on the projection 258 by pin 259, and overlying the lever 257 is another lever 261 having a roller 262 on its free end. The end of the lever 261 is provided with a lug 263 in which is slidably mounted a rod 264, the rod being connected to the lever 257 by means of a pin 265. An expansible spring 266 is carried by the rod 264 between the lug 263 and the lever 257 for the purpose of maintaining the parts of the mold structure in proper position.

Pivotally mounted to the column 2 adjacent to station IV, is a mold closing shoe 267 which is adapted to be projected into engagement with the roller 262 while the spindle-carrying spider 51 is stationary and thereby swing the lever 261 on its pivot 259, the lever 257 also being swung on its pivot 259. In this manner the links 254 and 255 will be moved outwardly (away from the column 2) and in doing so the mold halves 249 will be closed around the blank depending from the associated spindle. The lug 263 on the end of the lever 261 is formed with a downward projection that is adapted to be engaged in a notch 268 formed on the upper surface of a spring-pressed latch 269 pivoted to the sleeve 240 as shown by Fig. 19. When the mold halves are being closed, the notch 268 will engage the latch and thus prevent opening of the mold halves until the latch is released by the travel of the sub-unit around the central column 2 as will be hereinafter described.

The shoe 267 is connected to an actuating lever 270 by means of a link 271, the other end of the lever being fixed to the upper end of a vertical shaft 272 mounted on the exterior of the column 2, as shown by Fig. 26. To the lower end of the shaft 272 is fixed one end of a lever 273 the opposite end of which is forked for engagement with a pin 274 carried by a horizontal bar 275 slidably mounted on the base 1. The bar 275 is hollow and in it is mounted a spring pressed rod 276 which projects from the end of the bar 275 and is connected to a hook 277 that is pivoted to one end of a bell-crank lever 278 working in the cam 44 on shaft 42 previously described. Also carried by the lever 278 is a latch 279 for engaging the extended portion of the hook 277 to disconnect the hook from the rod 276 when it is desired to prevent closing of the mold.

After the mold is closed around the blank depending from the spindle at station IV, by the shoe 267 actuated from shaft 42, it will be held closed by the latch 269, that is engaged with the lever 261, until it approaches station VI where the latch 269 is depressed by a cam 333 projecting outwardly from the column 2. As the mold continues its travel around the column, the roller 262 engages with another cam 334 projecting outwardly from the portion 50 of the column 2, the cam 334 being so designed that the roller 262 will be swung inwardly away from the mold, and in doing so will also swing the lever 257 inwardly thereby opening the mold.

*Air.* (*Figs. 1, 14, 15, 16, 20 and 21.*)

Two sources of air supply are employed, the one for producing the preliminary puff of expansion of the blank and the other final blowing of the blank in the mold. The puff air for each spindle is derived from an air pump cylinder 281 mounted within the lower portion of the sleeve 123. The plunger 181 has flexibly connected to its lower end a push-rod 282 which projects downwardly through the cylinder 281 and terminates at a distance below the underside of the sleeve. Surrounding the rod 282 is a tubular piston rod 283 having a piston 284 of approved design fixed to its upper end. On the lower end of the tubular piston rod 283, is a bushing 285 having formed therein an annular groove 286 in which is mounted a cross-head 287. Projecting from the cross-head 287 is a pin 288 which receives one end of a link 289, the opposite and upper end of the link 289 being pivotally connected to one arm 290 of a rocker shaft 291 mounted in the trunnion 121, as shown by Figs. 20 and 21. The other arm 292 of the shaft 291, is worked by a push-rod 293 slidably mounted in a central bore formed in the trunnion 121. The rocker shaft is held in normal position by means of a spring 294. The rod 282 has formed therein an annular groove 295, which is in alignment with an annular groove 296 formed in the bottom of the cylinder 281, that communicates with a central bore formed in the plunger. The tubular piston rod 283 has perforations 297 near its lower end. When the tubular piston rod is raised to the upper end of its stroke, the perforations 297 will register with the grooves 295 and 296, and thus permit the passage of air from the groove 296 to the central bore formed in the plunger.

Formed on the sleeve 123 is an annular groove 298 which is connected to a groove 299 formed in the bottom of the sleeve 123 by means of passages 300, the groove 299 being in connection with groove 296 by passages 301. The trunnion 120 has formed therein a central passage 302, the inner end of which registers with the groove 298 formed on the sleeve 123. Joined to the outer end of the passage 302 is a pipe 303. The opposite end of the pipe 303 leads to an air valve 304 mounted on the spider 51.

The air valve 304 (Fig. 15) comprises an air chamber of suitable volume provided with a valve 305, the chamber having an inlet 306 from a suitable source of air under pressure. The stem of the valve 305 projects outwardly a suitable distance and is struck by the end of a lever 307 fixed to the upper end of a vertical rod 308 carried by a bracket 309 secured to one of the mold supporting brackets 224, and thus by the spider. Mounted on the rod 308 and extending laterally therefrom is a horizontal arm 310 which is struck by the pin 252 on the mold (see Fig. 16), when the mold halves are closed as hereinbefore described.

The push rod 293 which is axially slidable in the trunnion 121 and projects beyond the end thereof is adapted to be struck by a lever 311 fast on the upper end of a vertical rod 312 mounted in a bracket 313 which is carried by the periphery of the spider 51. Fast on the lower portion of the rod is an arm 314 having a slot therein in which is connected a link 315 pivoted on the outer end of a rod 316 which is slidably mounted in guides 317 dependent from the spider 51. The inner end of the rod 316 carries a roller 318 which rides on a peripheral cam 319 formed on the upper portion of the column 2, the roller 318 being held against the cam by means of the spring 294 previously described.

*The unloader.* (*Figs. 30 and 31.*)

Mounted above the base 1 between columns 4 and 6, is a discharge trough 320 which is inclined towards the front of the machine, and is provided with a vertical partition 321, (the trough being made wide enough to receive the finished articles from both machine units). The trough is so designed that the finished articles, as they are released from the spindles at station VI while the spider is stationary, will be directed thereinto by a chute 322 which is adapted to be moved into position beneath the finished article prior to the ejection of the article from the spindle. Each machine unit is provided with an independently actuated chute 322, the chute for the right-hand unit being supported by the column 6, while the chute for the left-hand unit is supported by the column 4.

Referring now to Figs. 30 and 31 wherein is shown the unloading mechanism for the right-hand unit, the chute 322 is carried by a sleeve 323 slidably mounted on a vertical rod 324 suitably fastened to the column 6. The sleeve 323 is linked to the inner end of an arm 325 of a rock shaft 326 mounted on the column 6. The shaft 326 has another arm 327 extending laterally therefrom at its other end.

Pivoted to the column 6 and extending laterally therefrom and located beneath the arm 327, is an arm 328 carrying intermediately thereon a roller 329 running on a cam 330 mounted on shaft 42, the extremity of the arm 328 being suitably connected to the end of the arm 327, such as by means of a flexible link 331. The roller 329 of the arm 328 is kept in contact with the cam 330 by means of a spring 332 that is connected to the outer end of the arm 328 to the base 1, as shown by Fig. 31.

When the spindle approaches station VI the mold will be opened and the spindle swung upwardly on its trunnions to an angle of about 30°. This movement of the spindle will project the finished article outwardly over the chute 322. The chute is then raised by the cam 330 to a position immediately below the article, and when such article is released from the spindle, the chute will guide it into the trough 320. The cam 330 is so designed that the chute will be elevated during a portion of the period that the spindle remains stationary at station VI, this period being of sufficient duration to permit the chute to receive the article ejected from the spindle before the spider is again set in motion.

*Operation.*

The following will be restricted to the cycle of a single machine unit, it being understood that stepping of the spiders of the two units occurs alternately. Presuming that a spindle of the selected unit is erect and at what is designated as station I, with all driving shafts in rotation, with the glass-receiver and the plunger up, the spindle plunger down, and the neck rings open. The rotation of the shaft 17 presses down the rod 93, which, through the cushion in the cylinder 92 yieldingly depresses the glass-receiver 81, moving it towards the top of the spindle erect beneath it. The downward motion of the receiver acts to depress through the foot 220, the lever 207, and thereby by a camming action on the lower cam faces 206 of the levers 203 to close the neck-rings 227 around the upper end of the inner tube of the cylinder. The continued depression of the glass-receiver causes the beveled seat 89 to seat upon the corresponding beveled shoulder around the top edge of the neck-ring, whereby the parts are firmly united and strained, tending to close the neck-ring during which time the pressing is taken directly by the receiver.

Upon the completion of this movement a charge of glass is projected through the side opening 90 of the receiver, from the trough 33, the timing of arrival of this charge being dependent upon the setting of the glass-feeder itself, and hence forming no part of this invention. In the meantime, the internal plunger 181 of the spindle is lifted by the bell-crank lever 188 worked from the arm 94 through the rocker arm 191, as previously described.

The charge of glass having entered the receiver, the upper external press-plunger 105 is driven down by the descent of the piston 101 through the interposition of the air-cushion before described, the piston 101 taking its motion from the overhead shaft 17. The glass in the receiver is thus formed into a blank preferably of the general shape described in Patent No. 1,235,008, July 31, 1917. The pressing action causes glass to flow in the cavity formed between the upper end of the follower ring 195, and the inturned flange 223 of the neck ring, the follower yielding under this pressure, if necessary, as is described in my aforesaid patent. This position of the parts is illustrated in Figure 35. The internal plunger 181 drops simultaneously with lifting of the receiver and external plunger from the head of the spindle by the over-head shaft 11, leaving a pressed blank grasped in the neck ring on the upper end of the spindle (see Fig. 36).

The spider is now put in motion to carry the spindle under discussion to and arrested at station II. Immediately upon the start of this motion of the spider, the rod 149 associated with the spindle under consideration rides up on the raised portion 158 of the track 159, and the spindle is put in rotation, it being at this time erect. As the spindle under consideration reaches station II, the next adjacent spindle to the rear thereof reaches station I, where the actions above described are repeated.

While the spindle under consideration is stationary at station II, and is erect, a flame from a burner 335 (Fig. 33) is projected onto the top of the blank held at the end of such spindle to reheat the same, whereby the proper settling of the blank, and its subsequent blowing without causing optical marks, is facilitated. The spindle is again stepped to station III. During the travel to this station, the spindle, which is still in rotation, is inverted by the travel of the roller 173 in the fixed cam track 163. The inversion is completed before the spindle under consideration reaches station III (see Fig. 33).

During the travel in question, the tubular piston 284 is moved inwardly of the spider sleeve by means of the fixed cam 319, thereby compressing puff air in the cylinder 281, which escaping around the internal plunger 181, enters the cavity in the blank left by the retrogression of the internal plunger, serving to expand or puff such blank. A plurality of such movements of the tubular plunger may be given if desired.

At station III, the necker associated with the spindle under consideration, is pressed towards the blank of glass dependent from what is now the bottom but was the top of the spindle, by its drive from the lower shaft 42, this action of the necker being somewhat delayed to permit the blank starting down in its elongation at station III, the elongation being aided by the necking action, as is described in my aforesaid patent.

The spider is again put in step motion and moves to station IV. During this motion, the spindle-rotating clutch is disengaged by the rod 149, dropping onto the depressed portion 162 of the track 159, thereby arresting the rotation of the dependent blank as is desirable during the period of mold-closure. The associated mold, which was raised from the water trough shortly after its position at station I, is now closed around the depending blank by the rotation of the shaft 42, and the closing of the mold opens the blowing air-valve 305, to admit air through the passages 302 and 301 (the latter being now in registration with the apertures 297) in the tubular plunger, into the interior of the blank to blow the same into form. While at station IV, the spindle-rotating clutch is again engaged, this time by the lifting of its rod 149 by the tappet 147, actuated from the main drive. (Figs. 28 and 29.)

The spider is again set in rotation, and moves to station V, and after a pause there continues to station VI. During this time the blank is in rotation in the mold and being blown. As the spindle in question approaches station VI, the molds are opened by the action of cams 333 and 334 on column 2. At about the same time, the rotation of the spindle is stopped by the disengagement of its driving clutch, due to the dropping of the rod 149 into the depressed portion 160 of the cam track 159, and the inverted spindle has the end with the glass dependent therefrom moved slightly outwardly, say about 30°, in which position the spindle is when it reaches station VI, the spindle being held rigidly in this position by means of an arm 336 extending from the ring 122 engaging with a cam 337 supported by the columns 4 and 6 (see Figs. 1, 8, and 16). At station VI, the neck rings are opened by the drive of over-head shaft 12, and the finished article carried thereby drops into the unloader chute 322.

The movement of the spider is again started, and as the spindle in question approaches station I before considered, the spindle is again placed in an erect position from the fixed cam 163. It thus arrives at station I in the position assumed at the commencement of this description, and during this movement the mold is lowered into the trough 244 by the cam 243.

Having thus described my invention, what I claim is:—

1. In a glass-working machine, the combination with an intermittently traveling support, of a glass-carrying spindle mounted on such support, means including a clutch for rotating the spindle upon its longitudinal axis, means for engaging the clutch by the travel of the support, and means for re-engaging the clutch while the support is at rest.

2. In a glass-working machine, the combination with an intermittently traveling support, of a glass-carrying spindle mounted on such support, means including a clutch for rotating the spindle on its longitudinal axis, means actuated by the travel of the support to engage and disengage the clutch, and means for re-engaging the clutch when the support is at rest to cause a rotation of the spindle.

3. In a glass-working machine, the combination with an intermittently traveling support, of a glass-carrying spindle mounted on such support and adapted to be rotated upon its longitudinal axis while the said support is traveling through certain zones, means for arresting the rotation of the spindle while the said support is traveling through other zones, and means for causing the spindle to rotate when the said support is at rest at certain positions.

4. In a glass-working machine, the combination with an intermittently traveling glass-working spindle, of a neck-ring mounted upon the spindle beyond the end thereof, said neck-ring comprising pivoted halves adapted to be opened and closed, a lever carried by the spindle for engaging the halves of the neck-ring to open and close the same, and automatic means for opening and closing the neck-ring during intermissions of travel of the spindle.

5. In a glass-working machine, the combination with a central column, of a glass-working unit comprising a glass carrier and an associated mold mounted for intermittent travel around the column, means carried by the column for rotating the carrier in the unit while the unit is in motion, and means for rotating the carrier in the unit while the unit is at rest.

6. In a glass-working machine, the combination with a central column, of a glass-carrier mounted for intermittent travel therearound and also for movement upon its own axis, means carried by the column for rotating the carrier, a clutch interposed in the driving connection to the carrier, and means actuated at certain times by the travel of the carrier for engaging and disengaging the clutch and actuated at another time while the carrier is at rest for engaging the clutch.

7. In a glass-working machine, the combination of two glass-working units, each having a rotatable spider carrying a plurality of glass-working units, mechanism for intermittently turning the units alternately in opposite directions, mechanism for locking each unit between its movements, a single driving mechanism for actuating the unit rotating mechanisms, and manually controlled means for stopping the effective operation of the mechanisms of either units without affecting the operation of the mechanism of the other unit.

8. In a glass-working machine, the combination with an air working glass-carrying spindle mounted for travel around a column, of means formed in the spindle and actuated by the movement of the spindle around the column for forcing a puff of air into the blank carried by the spindle.

9. In a glass-working machine, a plurality of glass-carrying spindles mounted on a support for intermittent rotary travel, necking means associated with each of said spindles, and means for actuating the neckers while the motion of the support is intermitted.

10. In a glass-working machine, a plurality of glass carrying spindles mounted on a support, necking means associated with each spindle, means for rotating the support, and means independent of the rotating means for moving the necking means in respect to the spindles.

11. In a glass-working machine, the combination with a traveling glass working unit comprising a pivoted glass-working spindle mounted for rotation about its axis at right angles to its pivot, a mold, a main drive, and separate and independent connections from the main drive for independently setting the glass-working unit in motion and thereby inverting the spindle forming a part thereof and for closing the mold respectively.

12. In a glass-working machine, the combination with a traveling glass working unit comprising a pivoted glass-working spindle mounted for rotation about its axis at right angles to its pivot, a mold, a main drive, and independent and separate connections from the main drive for imparting a step by step motion to the units, for rotating the spindle of such units and inverting the same, and for closing the mold and engaging a spindle rotating clutch, respectively.

13. In a glass-working machine, the combination with an intermittently traveling support, of a glass-carrying spindle thereon, said spindle being adapted to be rotated upon its longitudinal axis while the said support is traveling through certain zones, a clutch for controlling the rotating means of said spindle, and a lever actuated by the travel of the said support for engaging and disengaging said clutch when the spindle is in certain of the zones.

14. In a glass-working machine, the combination with an intermittently traveling support mounted on a vertical column, of a glass-carrying spindle mounted on the support and adapted to be rotated upon its longitudinal axis, a clutch for controlling the rotating means of said spindle, and a lever carried by the said support for engaging and disengaging the clutch, said lever being actuated by a fixed cam formed on said vertical column.

15. In a glass-working machine, the combination with an intermittently traveling support mounted on a vertical column, of a glass-carrying spindle mounted on the support and adapted to be rotated upon its longitudinal axis, a clutch in the rotating means of said spindle, a lever carried by the support for actuating the clutch, said lever riding on a fixed cam formed on said vertical column when the said spindle is moving through certain zones, and a tappet member for actuating the lever to engage the clutch when said support is stationary.

16. In a glass working machine, the combination with a glass receiver having notch formed in its side so as to provide a passageway for charges of glass, of a press plunger working in said receiver and at all times closing the upper end of said receiver against the admission of glass through such upper end.

17. In a glass-working machine, the combination with a glass receiver having a notch formed in its side wall to provide a passageway for charges of glass, of a press plunger working within said receiver and adapted to close said notch.

18. In a glass-working machine, the combination with a glass receiver having a notch formed in its side wall to provide a passageway for charges of glass, of a neck mold and plunger forming a removable base for such receiver, and a press plunger working within said receiver and adapted to close said notch.

19. In a glass-working machine, the combination with a traveling support carrying a glass-working spindle, an air pump formed in the spindle and having a piston rod extending therefrom, a rocker shaft mounted in the spindle and connected to said piston rod, and means for actuating the rocker shaft by the travel of the said support to cause the piston rod to compress the air in the pump.

20. In a glass-working machine, the combination with a traveling support, of a glass-carrying spindle thereon, a pump formed in the spindle and adapted to deliver air into blanks carried by the spindle, a piston rod extending from the pump, a stationary cam, and means operated by said cam for actuating the piston rod.

21. In a glass-working machine, the combination with a pair of preforming mechanisms, of a pair of intermittently traveling spiders carrying a plurality of glass-working spindles, a yoke connecting the spiders, and means for actuating the yoke to move the spiders in opposite directions for alternately registering the spindles in co-operative position with the preforming mechanisms.

22. In a glass-working machine, the combination with a pair of preforming mechanisms, of a pair of intermittently traveling spiders carrying a plurality of glass-working spindles, a yoke connecting the spiders, continuously driven means for actuating the yoke to move the spiders alternately in opposite directions for registering the spindles in co-operative position with the preforming mechanisms, and latches in the ends of the yoke connected to the spiders for the purpose of disconnecting the yoke movement from either of the spiders.

23. In a glass-working machine, the combination with a glass receiver, of a neck mold and plunger forming a removable base for such receiver, a press plunger working with the receiver, a receding follower surrounding the plunger and enclosed with the neck mold and yielding upon the pressing in the receiver of an excessive charge of glass, and positive means for restoring the follower to its normal position during the ejecting of the glass.

In testimony whereof I have hereunto signed my name, this 7th day of July, 1922.

ROBERT W. CANFIELD.